(12) United States Patent
Yasukochi

(10) Patent No.: US 10,703,085 B2
(45) Date of Patent: Jul. 7, 2020

(54) MODELING APPARATUS AND MODELING METHOD

(71) Applicant: SONY CORPORATION, Tokyo (JP)

(72) Inventor: Hiroyuki Yasukochi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 214 days.

(21) Appl. No.: 15/102,607

(22) PCT Filed: Dec. 15, 2014

(86) PCT No.: PCT/JP2014/006230
§ 371 (c)(1),
(2) Date: Jun. 8, 2016

(87) PCT Pub. No.: WO2015/093032
PCT Pub. Date: Jun. 25, 2015

(65) Prior Publication Data
US 2016/0311163 A1    Oct. 27, 2016

(30) Foreign Application Priority Data

Dec. 20, 2013 (JP) .................................. 2013-264074

(51) Int. Cl.
*B33Y 80/00* (2015.01)
*B33Y 50/02* (2015.01)
(Continued)

(52) U.S. Cl.
CPC ............ *B33Y 80/00* (2014.12); *B29C 64/129* (2017.08); *B29C 64/135* (2017.08); *B29C 64/20* (2017.08);
(Continued)

(58) Field of Classification Search
CPC ..... B29C 64/129; B29C 64/135; B29C 64/20; B29C 64/386; B29C 64/40;
(Continued)

(56) References Cited

U.S. PATENT DOCUMENTS 5,425,848 A * 6/1995 Haisma ............... B29C 35/0888
216/23
5,650,260 A * 7/1997 Onishi .................. G03F 7/0037
264/401

(Continued)

FOREIGN PATENT DOCUMENTS

JP          07108609 A    4/1995
JP    HEI 07-108609 A    4/1995
(Continued)

OTHER PUBLICATIONS

JPH11254543A-MT (Year: 1999).*

*Primary Examiner* — Matthew J Daniels
*Assistant Examiner* — Yunju Kim
(74) *Attorney, Agent, or Firm* — Chip Law Group

(57) ABSTRACT

A modeling apparatus includes a stage, an irradiation unit, a moving mechanism, and a stage-rotating mechanism. The irradiation unit selectively irradiates a region of a material supplied onto the stage, with an energy ray. The moving mechanism relatively moves, at least in a stacking direction of the material, the stage and the irradiation unit. The stage-rotating mechanism rotates the stage.

16 Claims, 18 Drawing Sheets

(51) Int. Cl.
*B33Y 30/00* (2015.01)
*B33Y 10/00* (2015.01)
*B29C 64/135* (2017.01)
*B29C 64/386* (2017.01)
*B29C 64/20* (2017.01)
*B29C 64/129* (2017.01)
*B29C 64/277* (2017.01)
*B29C 64/241* (2017.01)
*B29C 64/40* (2017.01)

(52) U.S. Cl.
CPC ............ *B29C 64/386* (2017.08); *B29C 64/40* (2017.08); *B33Y 10/00* (2014.12); *B33Y 30/00* (2014.12); *B33Y 50/02* (2014.12)

(58) Field of Classification Search
CPC ..... B29C 67/0066; B29C 35/08; B33Y 10/00; B33Y 30/00; B33Y 50/02; B33Y 80/00; B32B 3/30; G03F 7/34; A61N 5/00; G02F 1/01; B44C 1/22
USPC ....... 425/375; 250/492.1; 428/156; 430/269; 216/48
See application file for complete search history.

(56) References Cited

U.S. PATENT DOCUMENTS

| | | | | |
|---|---|---|---|---|
| 6,213,168 | B1* | 4/2001 | Gaylo | B22F 3/004 141/12 |
| 2003/0206820 | A1* | 11/2003 | Keicher | B05B 7/14 419/9 |
| 2004/0148048 | A1* | 7/2004 | Farnworth | B33Y 50/02 700/119 |
| 2009/0140172 | A1* | 6/2009 | Kihara | B29C 64/135 250/492.1 |
| 2012/0045617 | A1* | 2/2012 | Yasukochi | B29C 67/0066 428/156 |
| 2014/0014631 | A1* | 1/2014 | Morikazu | B23K 26/02 219/121.61 |

FOREIGN PATENT DOCUMENTS

| | | |
|---|---|---|
| JP | 11-254543 A | 9/1999 |
| JP | HEI 11-254543 A | 9/1999 |
| JP | 2002-249804 A | 9/2002 |
| JP | 2004-034298 A | 2/2004 |
| JP | 2012-040757 A | 3/2012 |

* cited by examiner

A

B

A

B

A

B $$dH = Ht \left( \frac{1}{1-\alpha} - 1 \right) \quad \cdots \text{Expression (1)}$$

$$dH = \frac{dD^2}{2 \times Rg} \quad \cdots \text{Expression (2)}$$

$$dD = \sqrt{2 \times Rg \times Ht \times \left( \frac{1}{1-\alpha} - 1 \right)} \quad \cdots \text{Expression (3)}$$

MODELING APPARATUS AND MODELING METHOD

CROSS REFERENCE TO RELATED APPLICATIONS

This application is a U.S. National Phase of International Patent Application No. PCT/JP2014/006230 filed on Dec. 15, 2014, which claims priority benefit of Japanese Patent Application No. JP 2013-264074 filed in the Japan Patent Office on Dec. 20, 2013. Each of the above-referenced applications is hereby incorporated herein by reference in its entirety.

TECHNICAL FIELD

The present invention relates to a modeling apparatus that forms a three-dimensional object from a material curable by an energy ray of light or the like and to a method of manufacturing a modeled object by this modeling apparatus.

BACKGROUND ART

One of methods mainly used for a modeling apparatus is an optical modeling method, for example. The optical modeling method is a method in which, by partially selectively irradiating a light-curable resin with laser light, a desired portion of the resin is cured and drawn for forming a modeled object. The optical modeling method includes a method called regulated liquid level method. In the regulated liquid level method, the liquid level of the light-curable resin is regulated by, for example, a flat glass surface and drawing is performed by laser light being focused on an interface between the liquid level and the glass surface via the glass.

A modeling apparatus described in Patent Document 1 includes, for example, a cylindrical drum. A slit region long in one direction is formed between a drum and a modeling stage. In this slit region, a light curable material is irradiated with light. It is called one-dimensional regulated liquid level method. With this, the cured layer of the material can be cleanly peeled off from the drum (e.g., see Patent Document 1).

Patent Document 1: Japanese Patent Application Laid-open No. 2012-40757

SUMMARY OF INVENTION

Problem to be Solved by the Invention

In general, there is a disadvantage that it takes long time to form the modeled object by the modeling apparatus and thus the productivity is low. It is an object of the present technology to provide a modeling apparatus by which the time necessary to form the modeled object can be shortened and a method of manufacturing a modeled object by the same.

Further, a demand for enhancing the modeling accuracy of the modeling apparatus, that is, printing with high accuracy is increasing year by year. It is another object of the present technology to provide a modeling apparatus capable of forming a highly accurate modeled object and a method of manufacturing a modeled object by the same.

Means for Solving the Problem

In order to accomplish the objects above, a modeling apparatus according to an embodiment of the present technology includes a stage, an irradiation unit, a moving mechanism, and a stage-rotating mechanism.

The irradiation unit selectively irradiates a region of a material supplied onto the stage, with an energy ray.

The moving mechanism relatively moves, at least in a stacking direction of the material, the stage and the irradiation unit.

The stage-rotating mechanism rotates the stage.

The moving mechanism makes laminated molding possible and the rotation of the stage can spin off and remove an uncured material due to a centrifugal force. With this, in comparison with a removing method, for example, flushing the uncured material with cleaning liquid, the time necessary to form the modeled object can be shortened. Further, the stage is rotatable, and hence it is possible to perform modeling while rotating the modeled object. Thus, in comparison with (modeling for one layer by) normal printing by scanning along two axes in a plane, the modeling time can be shortened.

A modeling apparatus according to another embodiment of the present technology includes a stage, a first irradiation unit, a moving mechanism, and a second irradiation unit.

The first irradiation unit selectively irradiates a region of a material supplied onto the stage, with an energy ray.

The moving mechanism relatively moves the stage and the irradiation unit in a stacking direction of the material.

The second irradiation unit irradiates the material irradiated by the first irradiation unit, with an energy ray.

This modeling apparatus is capable of forming a highly accurate modeled object by post curing processing of the second irradiation unit.

A modeling apparatus according to another embodiment of the present technology includes a stage, an exposure unit, and a moving mechanism.

The exposure unit includes a light-emitting array constituted of a plurality of solid-state light-emitting elements and selectively exposures a region of a material supplied onto the stage to light by the light-emitting array.

The moving mechanism relatively moves, at least in a stacking direction of the material, the stage and the light-emitting array.

The light-emitting array is used, and hence the scanning directions of the exposure unit can be reduced. With this, the time necessary to form the modeled object can be shortened.

A modeling apparatus according to another embodiment of the present technology includes a stage, a regulation member, an irradiation unit, and a moving mechanism.

The regulation member includes a surface formed of a curved surface convex toward the stage. The regulation member is opposed to the stage, to thereby be capable of being disposed such that a retention region including a position of a minimum gap formed in a direction perpendicular to the stage is formed between the stage and the surface.

The irradiation unit irradiates a material of a material retained in the retention region, which is in a position deviated from the position of the minimum gap, with an energy ray.

The moving mechanism relatively moves the stage and the regulation member in a stacking direction of the material.

With this, a highly accurate modeled object can be formed.

A modeling apparatus according to another embodiment of the present technology includes a stage, a regulation member, an irradiation unit, and a moving mechanism.

The regulation member includes a surface partitioned into a plurality of regions. The regulation member is opposed to the stage, to thereby be capable of being disposed such that a retention region is formed between any one region of the plurality of regions of the surface and the stage.

The irradiation unit irradiates a material retained in the retention region, with an energy ray. The moving mechanism relatively moves the stage and the regulation member in a stacking direction of the material.

With this, it is possible to form a high-function structure in which a plurality of materials are integrated, with high accuracy.

A modeling apparatus according to another embodiment of the present technology includes a regulation member, an irradiation unit, a traveling body, and a moving mechanism.

The regulation member includes a surface formed of a curved surface convex toward a modeling target surface. The regulation member is capable of being opposed to the modeling target surface, to thereby form a retention region including a gap between the modeling target surface and the surface.

The irradiation unit selectively radiates an energy ray to a region of a material retained in the retention region.

The traveling body incorporates the regulation member and the irradiation unit and travels on the modeling target surface.

The moving mechanism is incorporated in the traveling body and moves the regulation member in a stacking direction of the material.

With this, it is possible to form structures of any size without increasing the size of the modeling apparatus.

A modeled object according to an embodiment of the present technology includes a structure formed of a first material and a filled portion formed of a second material.

The structure formed of the first material includes an outer surface, a first aperture, a second aperture having a capacity larger than a capacity of the first aperture, and a communication channel that causes the outer surface and the first aperture to communicate with each other.

The filled portion formed of the second material is filled in the communication channel and the first aperture and formed of a solid-state material different from the first material.

A method of manufacturing a modeled object according to an embodiment of the present technology includes supplying a material onto the stage.

The material of one or more layers is printed by irradiating a region of the material supplied onto the stage with an energy ray.

An uncured material that remains on a material cured in the printing is removed by rotating the stage or absorption.

After the uncured material is removed, a step of supplying the material and a step of curing the material of the one or more layers are sequentially performed.

A method of manufacturing a modeled object according to an embodiment of the present technology includes selectively radiating an energy ray to a region of a first material for each layer, to thereby form a structure including an outer surface, a first aperture, a second aperture having a capacity larger than a capacity of the first aperture, and a communication channel that causes the outer surface and the first aperture to communicate with each other. The first aperture is filled with a second material different from the first material due to a capillary force via the communication channel.

The filled second material is cured.

Effects of the Invention

Hereinabove, according to the present technology, the time necessary to form a modeled object can be shortened or the highly accurate modeled object can be formed.

Note that the effects described here are not necessarily limited and may be any of effects described in the present disclosure.

MODE(S) FOR CARRYING OUT THE INVENTION

Figure 1:
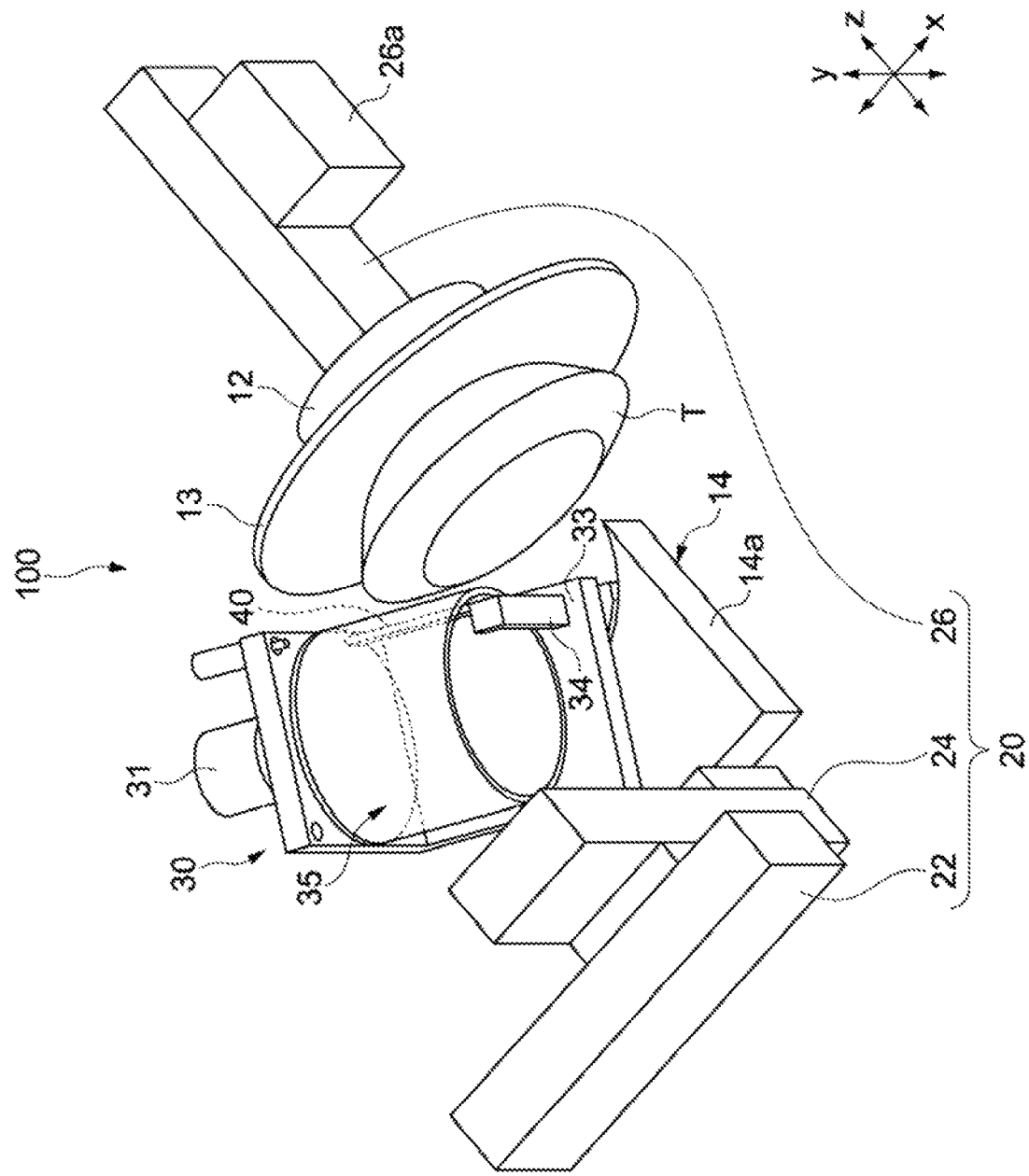
FIG. 1 is a perspective view schematically showing a modeling apparatus according to a first embodiment.

Hereinafter, embodiments of the present technology will be described with reference to the drawing.

1. Consideration of Factors that Inhibit Productivity of Modeled Objects

1) For example, after the end of modeling by a modeling apparatus, there is a process of flushing and removing an uncured resin material with cleaning liquid. This has been one of causes that deteriorates the productivity of modeled objects.

2) As the original concept of the modeling apparatus, a target to be modeled is universal and it is not optimized for a particular modeled object. In general, optical modeling has been mainly for application of a mock-up. To be universal, targets of any shape have to be modeled. Further, an optical modeling apparatus using a free liquid level method has no room for improvement due to its structure.

2. First Embodiment

1) General Configuration of Modeling Apparatus

FIG. 1 is a perspective view schematically showing a modeling apparatus according to a first embodiment. A modeling apparatus 100 includes a work plate 13, an exposure head unit 30, a moving mechanism 20, a plate-rotating mechanism 12 (stage-rotating mechanism), and a θ-rotation mechanism 14 (regulation member-rotating mechanism).

The moving mechanism 20 includes a z-movement mechanism 26, an x-movement mechanism 22, and a y-movement mechanism 24. An x-y plane is a horizontal plane and a z direction is a direction (gravity direction) perpendicular to the horizontal plane. In the present specification, "the moving mechanism" is a mechanism that linearly moves an object, which is distinguished from "the rotating mechanism" that causes rotational movement.

The work plate 13 functions as a stage for forming a modeled object. The work plate 13 is formed in a disk-like shape, for example. In FIG. 1, a modeled object T having, for example, a container-like shape is formed on the work plate 13.

The plate-rotating mechanism 12 is connected to the work plate 13 and includes a motor (not shown) that rotates the work plate 13.

The z-movement mechanism 26 includes a drive unit 26a including a motor and the like. The z-movement mechanism 26 is configured to be capable of moving the work plate 13 in the z direction that is a direction perpendicular to a surface (stage surface) of the work plate 13 by driving the drive unit 26a. The z-movement mechanism 26 is connected to the plate-rotating mechanism 12 and integrally moves the plate-rotating mechanism 12 and the work plate 13 in the z direction.

Note that a configuration in which the z-movement mechanism may be connected to the work plate 13 and the plate-rotating mechanism may integrally rotate the z-movement mechanism and the work plate 13 may be adopted.

The exposure head unit 30 is, for example, disposed below the work plate 13. Thus, the surface of the work plate 13, on which the modeled object T is formed, is oriented downwards. The exposure head unit 30 includes an irradiation unit (or exposure unit) 40 that, for example, radiates light, a cylindrical drum 35 serving as a regulation member that retains a light-curable resin (hereinafter, referred to as resin material) that is a material of the modeled object and regulates a liquid level of a resin material R, and a support section 33 that rotatably supports the drum 35. A motor 31 that rotates, for example, the drum 35 is mounted on the support section 33.

Figure 2:
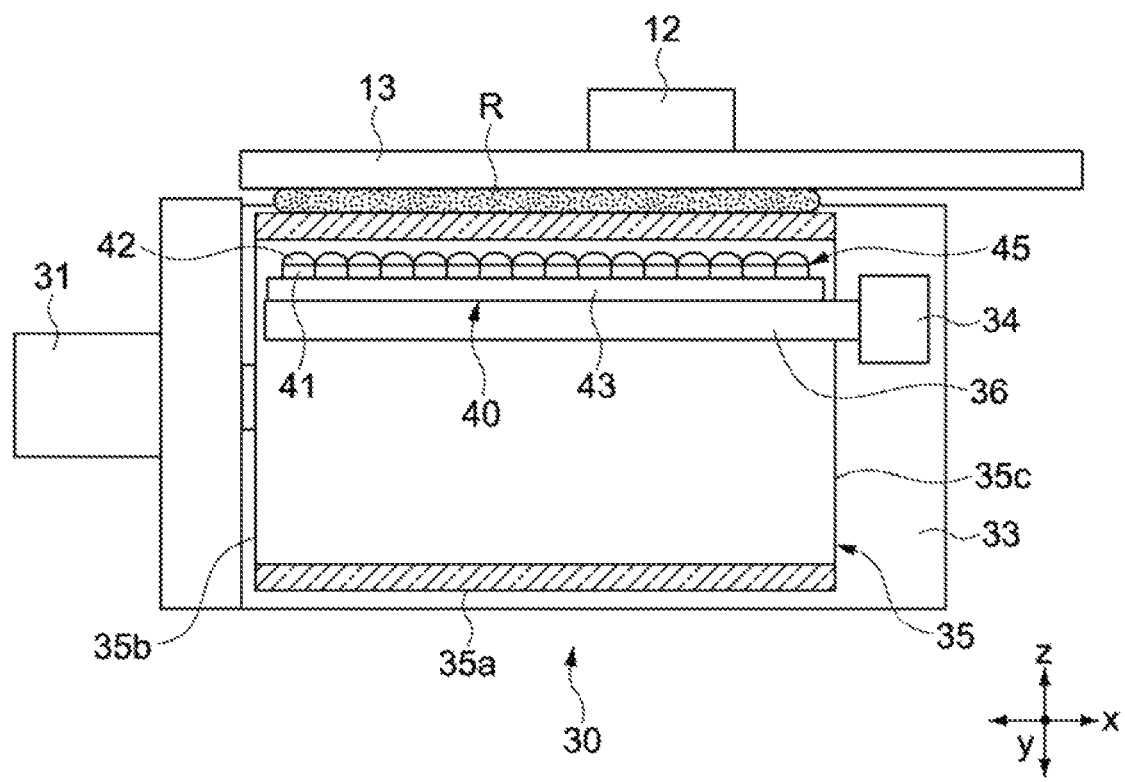
FIG. 2 is a diagram as mainly an exposure head unit is viewed in a y-direction.

FIG. 2 is a diagram as mainly the exposure head unit 30 is viewed in the y-direction. A driving shaft of the motor 31 is connected to one end 35b of the drum 35 in a longitudinal direction (x-direction) via a connecting member (not shown). One end 35b of the drum 35 may be closed. The other end of the drum 35 is opened (open end 35c). The drum 35 is formed of a material through which light passes, such as glass and acrylic.

An irradiation unit 40 is disposed in the drum 35 and has a shape long along a longitudinal direction of the drum 35. The irradiation unit 40 includes an LED array (light-emitting array) 45 formed of a plurality of LEDs (Light Emitting Diodes) 41 as a plurality of solid-state light-emitting elements. The plurality of LEDs 41 are arranged in a one-dimensional form along the longitudinal direction of the drum 35. The LED array 45 is mounted on a circuit board 43 such as a semiconductor and the circuit board 43 is mounted on a mounting member 36. The mounting member 36 is projected from the inside of the drum 35 to the outside of the drum 35 through its open end 35c, for example, and connected to a supporting pole 34.

Figure 3:
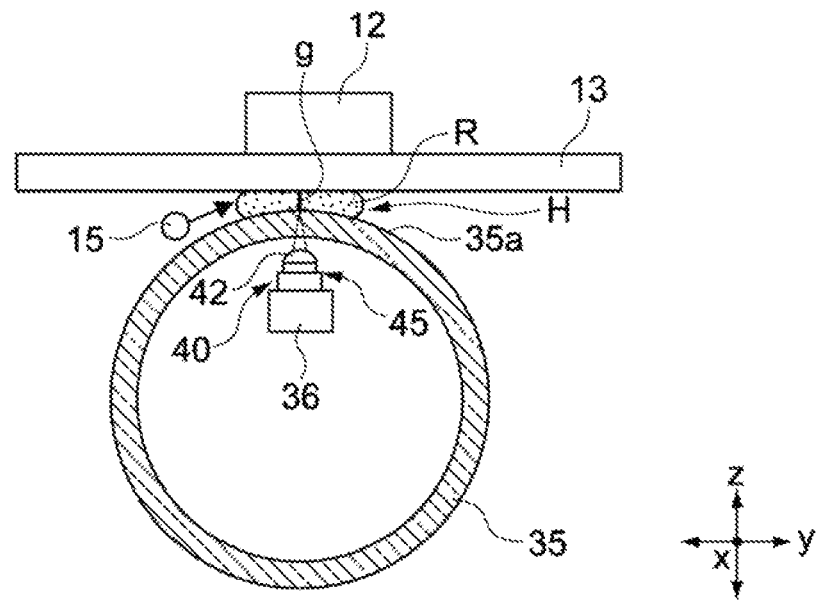
FIG. 3 is a diagram as an irradiation unit and a drum are viewed in an x-direction.

FIG. 3 is a diagram as the irradiation unit 40 and the drum 35 are viewed in the x-direction. Note that, in FIGS. 2 and 3, for the sake of easy understanding, components (LEDs 41, etc.) of the irradiation unit 40 are drawn with their scale being increased with respect to the drum 35.

The modeling apparatus 100 includes a supply nozzle 15 that is a part of a supply unit that supplies the resin material R. The supply nozzle 15 is formed long along, for example, the x-direction and positioned in vicinity of the work plate 13 above the drum 35. The supply nozzle 15 supplies the resin material R between the work plate 13 and the surface 35a of the drum 35.

The supply nozzle 15 does not need to have a long shape. In this case, the supply nozzle 15 includes a mechanism that performs scanning in the x-direction.

The irradiation unit 40 radiates light emitted from the LED array 45 to the resin material R supplied on the work plate 13 (or cured object being formed on the work plate 13) via a side wall of the drum 35. As will be described later, the exposure head unit 30 is movable by the x-movement mechanism 22, the y-movement mechanism 24, and the θ-rotation mechanism 14 in degrees of freedom of these three axes. Thus, the exposure head unit 30 is capable of arranging the drum 35 with respect to the work plate 13 such that the surface 35a of the drum 35 faces the surface of the work plate 13. The drum 35 faces the work plate 13 in this manner, and hence a retention region H is formed between the surface of the drum 35 and the work plate 13 (or cured object being formed on the work plate 13). The retention region H retains the resin material R due to a capillary force.

The LED array 45 includes condensing lenses 42 for each of the LEDs 41, for example. A group of the condensing lenses 42 is constituted of a one-dimensional microlens array. The position of the irradiation unit 40 relative to the work plate 13 is set such that the condensing lenses 42 are focused on the resin material R retained in the retention region H. Alternatively, according to such an optical design that diffused light emitted from the LEDs 41 is made parallel light by the condensing lenses 42, a distance between the irradiation unit 40 and the work plate 13 can be determined irrespective of the focal distance of the condensing lenses 42. A gradient index rod lens array may be used as the microlens array.

The pitch between the LEDs 41 can be appropriately set and can be a very small pitch of sub-millimeter order, for example.

The circuit board 43 includes a driver that individually drives the LEDs 41 of the LED array 45. The driver drives the LEDs 41 according to a command of a host computer that generally controls the modeling apparatus 100, for example. That is, by the driver individually driving one or more LEDs 41 out of the plurality of LEDs 41, which corresponds to a region in which the resin material R needs to be cured, selective radiation of (exposure to) light is performed.

The LED array 45 typically radiates an ultraviolet ray. In this case, an ultraviolet-curable resin is used as the resin material. As a matter of course, visible light and infrared ray may be used and the resin material can also be appropriately changed depending on them.

As shown in FIG. 1, the θ-rotation mechanism 14 includes a base stage 14a and is configured to be capable of rotating the exposure head unit 30 connected to the base stage 14a around a y axis. A base portion of the support section 33 of the exposure head unit 30, which is provided below the drum 35, is connected to a rotation axis (not shown) of the base stage 14a. The position of the rotation axis with respect to the base portion is not particularly limited and may be a center of the base portion or may be a position other than the center.

The y-movement mechanism 24 is connected to the base stage 14a of the θ-rotation mechanism 14 and configured to integrally move the θ-rotation mechanism 14 and the exposure head unit 30 in the y-direction.

The x-movement mechanism 22 is connected to the y-movement mechanism 24 and configured to integrally move the y-movement mechanism 24, the θ-rotation mechanism 14, and the exposure head unit 30 in the x-direction.

Note that the modeling apparatus 100 does not need use all of the z-movement mechanism 26, the x-movement mechanism 22, the y-movement mechanism 24, the plate-rotating mechanism 12, and the θ-rotation mechanism 14 for forming the modeled object. The moving mechanism or the rotating mechanism used during modeling is appropriately set depending on an allowable modeling time, the shape of the modeled object, and the like.

2) Operation of Modeling Apparatus

According to operations of the moving mechanism 20 and the θ-rotation mechanism 14, the work plate 13 and the drum 35 are arranged in positions as shown in FIG. 2. A minimum gap g (see FIG. 3) between the work plate 13 and the surface of the drum 35 corresponds to the thickness of one layer of printing of the resin material. That is, the minimum gap g corresponds a resolution of modeling in the z direction. The minimum gap g is set to be larger if the resolution is made lower, and the minimum gap g is set to be smaller if the resolution is made higher. A worker can appropriately input the settings into the host computer.

Figure 4:
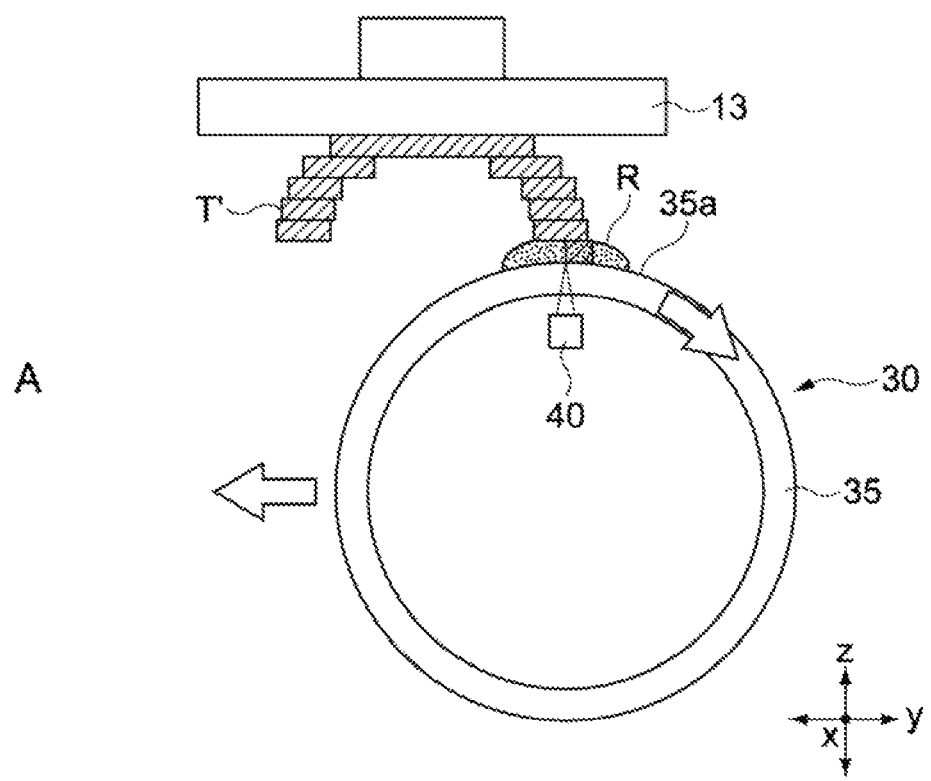
FIG. 4A is a diagram as main parts of the modeling apparatus during exposure are viewed in the x-direction and FIG. 4B is a diagram as it is viewed in the y-direction.
Figure 4:
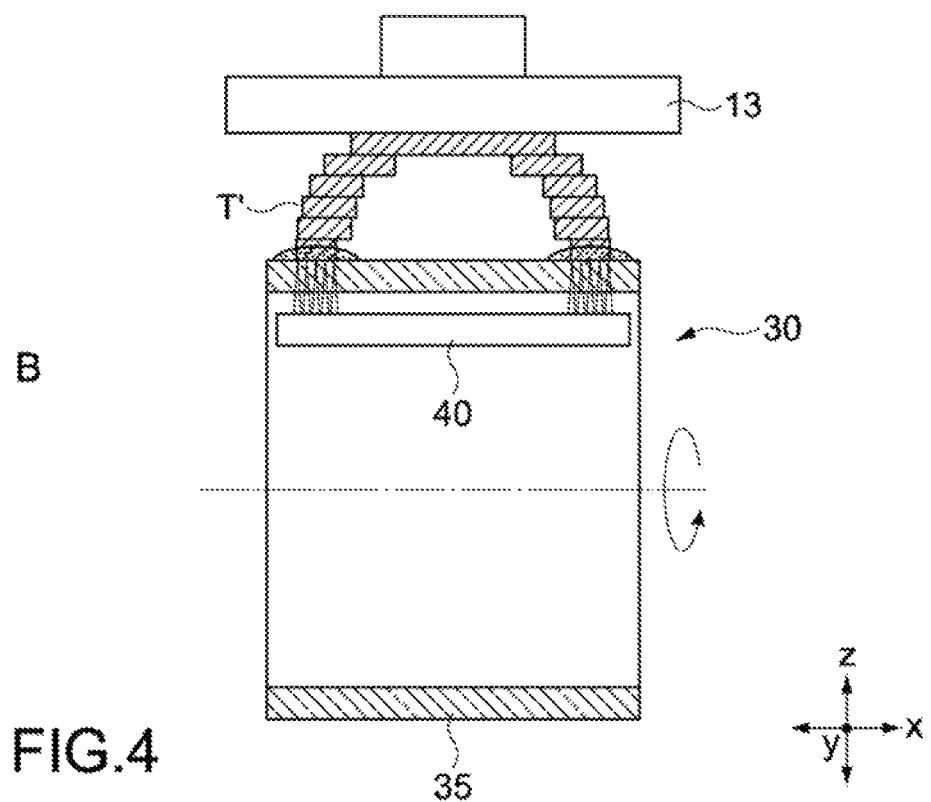

The supply nozzle 15 supplies the resin material R to the retention region H including the position of the minimum gap g. FIG. 4A is a diagram as the main parts of the modeling apparatus 100 during exposure are viewed in the x-direction. FIG. 4B is a diagram as they are viewed in the y-direction. Note that the irradiation unit 40 is simplified and drawn as a rectangular parallelepiped long in one direction in FIGS. 4A and 4B and the following figures.

As shown in FIGS. 4A and 4B, while the exposure head unit 30 including the irradiation unit 40 is scanned by the y-movement mechanism 24, the irradiation unit 40 selectively exposures the region of the resin material R retained in a retention region, to light by the use of the LED array 45. The LED array 45 is a one-dimensional array. Therefore, by the LED array 45 moving along the y-direction orthogonal to the one dimension, the resin material R is exposed to light and printed in a two-dimensional form. A cured object T' that is the resin material cured by exposure is not supported by any member from below. However, the cured object T' does not fall because it adheres and is fixed to the work plate 13.

While the exposure head unit 30 is moved in the y-direction, the motor 31 generates a speed in a tangential direction of the surface of the drum 35, which corresponds to a moving speed of the exposure head unit 30, for example. Note that the drum 35 is held in close contact with the resin material R, and hence, if it is rotated due to a moving force of the exposure head unit 30 in the y-direction, the operation of the motor 31 is unnecessary.

As shown in FIG. 2, a light irradiation position is set to the position of the minimum gap g of a region in the y-direction of the resin material R in the retention region H or to a position deviated from the position of the minimum gap g as will be described in the following embodiment. In this manner, the range of the region in the y-direction of the resin material R in the retention region H to which light is radiated is a very small part of the entire resin material R retained in the retention region H. Thus, the amount of the resin material R that is necessary for single scanning in the y-direction only needs to be the amount of the resin material retained in the retention region H.

When printing of the resin material for one layer is terminated, the material is stacked and printed by repeating the above-mentioned operation. In this case, the modeling apparatus 100 performs printing while the work plate 13 is moved (lifted up) by the operation of the z-movement mechanism 26 for each layer.

The formed cured object T' is not supported from below. Therefore, by the drum 35 being moved away from the work plate 13 by the moving mechanism 20, the capillary force acting on the resin material is cancelled and a most part of an unnecessary uncured resin material (hereinafter, referred to as uncured material) flows down due to the gravity.

Figure 5:
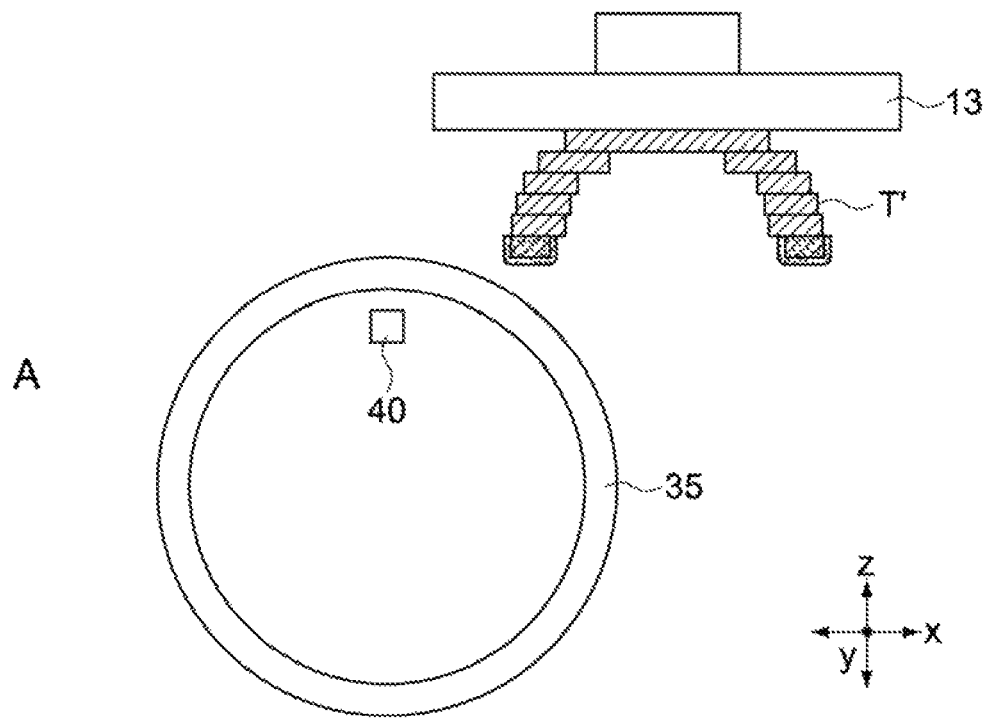
FIGS. 5A and 5B show operations of removing an uncured material due to a centrifugal force of rotation.
Figure 5:
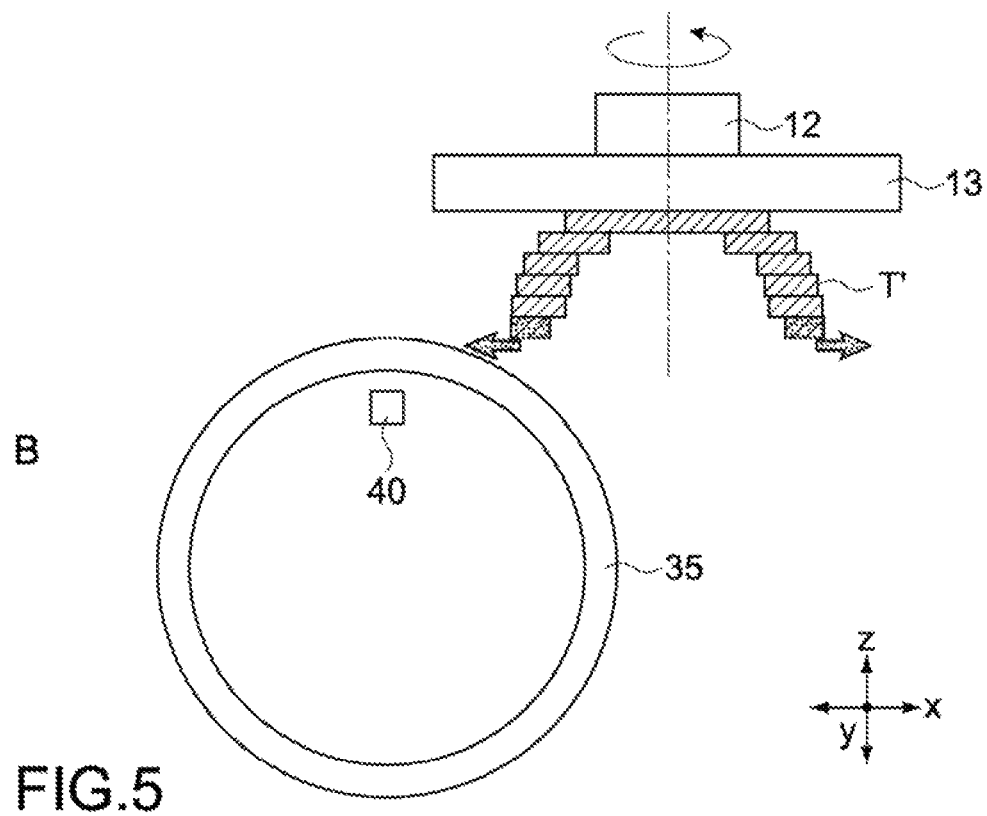

Printing of the resin material for one layer or two or more, a predetermined number of layers is terminated. At this point of time, as shown in FIG. 5A, the uncured material adheres to the bottom of the cured object T'. As shown in FIG. 5B, the work plate 13 is rotated by the operation of the plate-rotating mechanism 12. With this, the uncured material remaining on the cured object T' formed halfway is scattered around and removed due to the centrifugal force. In this case, the plate-rotating mechanism 12 functions as a "removing mechanism" for the uncured material.

The resin material is removed due to the centrifugal force in this manner, and hence the time required to form the modeled object can be reduced in comparison with a removing method, for example, flushing the uncured material with the cleaning liquid. That is, although the method using the cleaning liquid has been one of causes that deteriorates the productivity of modeled objects, it is possible to enhance the productivity of modeled objects according to the present technology.

When the modeled object is cleaned with a solvent such as ethanol after formation of the modeled object (after completion of modeling), it is possible to largely reduce the amount of use of the solvent.

In comparison with a general scanning method of exposure in which a point light source is used, a main scanning direction is set to the x-direction, and a sub scanning direction is set to the y-direction, the limit of the scanning speed in the x-direction can be exceeded by using the LED array 45 as in this embodiment. That is, the LED array 45 is scanned only in the y-direction, and hence the two-dimensional region can be selected and exposed to light in a short time.

The LED array 45 includes a number of light-emitting points. Therefore, in comparison with the point light source, total light power (i.e., energy) is larger and the curing speed is further increased, and hence the modeling time can be shortened.

Mechanical scanning in the x-direction is unnecessary and the number of mechanical parts in the drum 35 can be reduced. Thus, there are advantages in that the diameter of the drum 35 can be made smaller and the mechanism becomes simple, for example.

3) Modified Example of Removing Operation of Uncured Material

Figure 6:
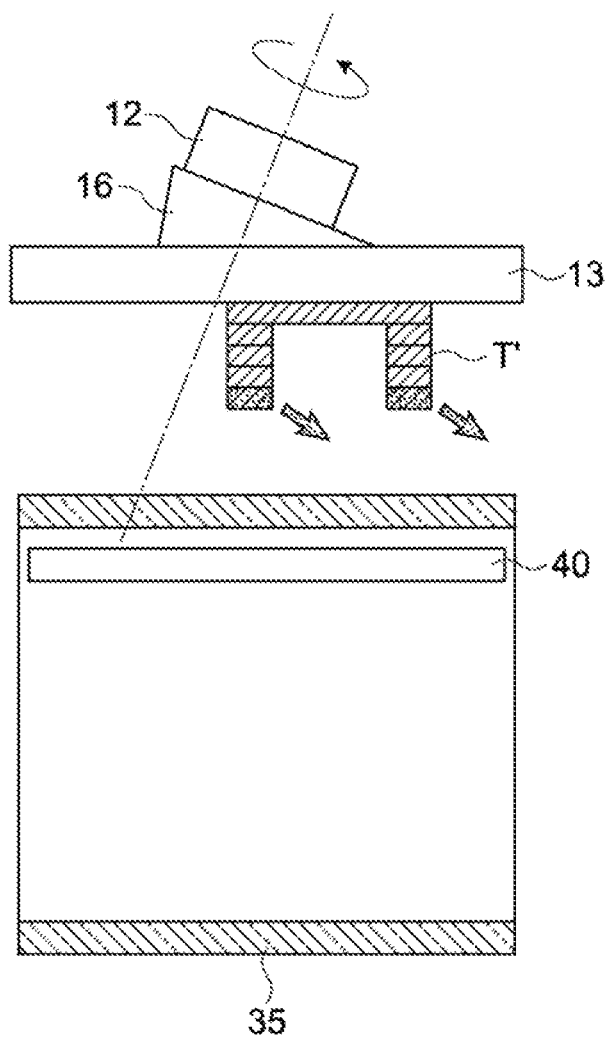
FIG. 6 shows another form of removal of the uncured material by rotation.

FIG. 6 shows another form of removal of the uncured material by rotation. This modeling apparatus includes a tilting mechanism 16 that tilts the plate-rotating mechanism 12 with respect to the work plate 13. For example, the tilting mechanism 16 is disposed between the plate-rotating mechanism 12 and the work plate 13. The tilting mechanism 16 is configured to tilt the plate-rotating mechanism 12 at an arbitrary angle within a predetermined angle range. With this, a z axis can be tilted.

As in the figure, with the plate-rotating mechanism 12 being tilted, the plate-rotating mechanism 12 rotates the work plate 13. For some shapes of the modeled object or some positions of the modeled object on the work plate 13, the uncured material can be more efficiently scattered when the rotation axis is tilted in this manner. For example, during rotation, a smaller centrifugal force acts on a part of the region of the cured object T' which is closer to the center of the work plate 13. By setting the tilt of the rotation axis at a predetermined angle with respect to the work plate 13, it is possible to give the material in the center position of the work plate 13 a desired centrifugal force during rotation and to remove the uncured material.

3. Second Embodiment

Next, a second embodiment will be described. Hereinafter, descriptions of the same members, functions, etc. as those of the modeling apparatus 100 according to the embodiment shown in FIG. 1 and the like will be simplified or omitted and different points will be mainly described.

Figure 7:
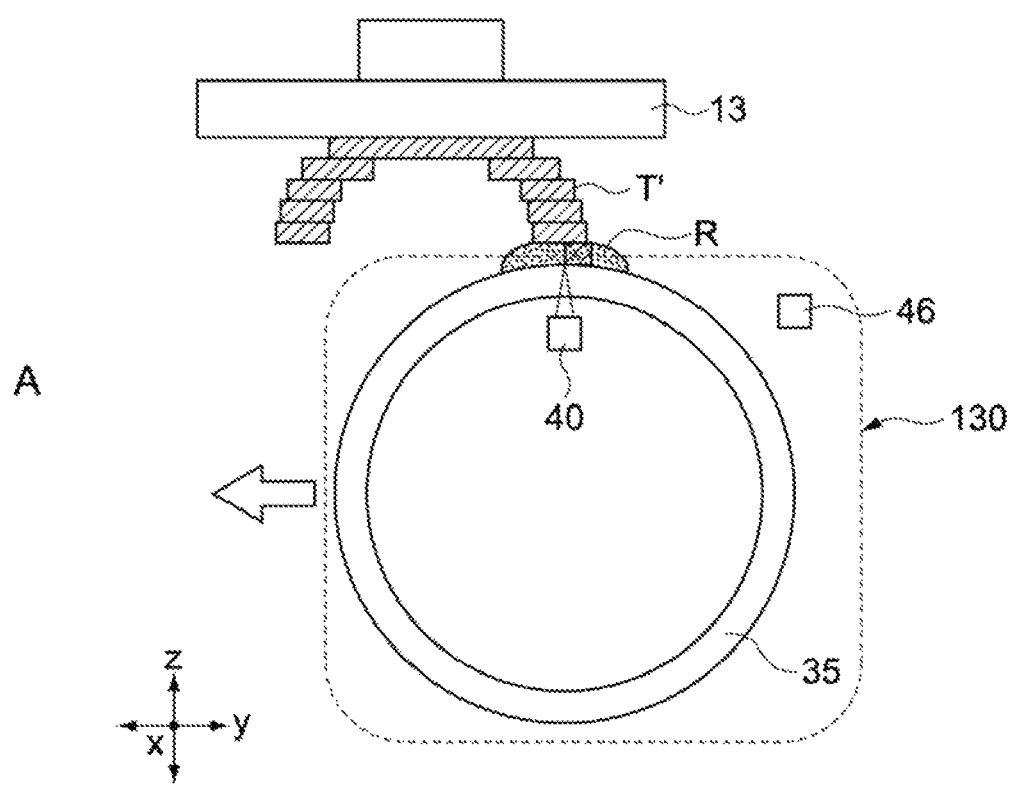
FIGS. 7A and 7B show operations of a modeling apparatus according to a second embodiment in sequence.
Figure 7:
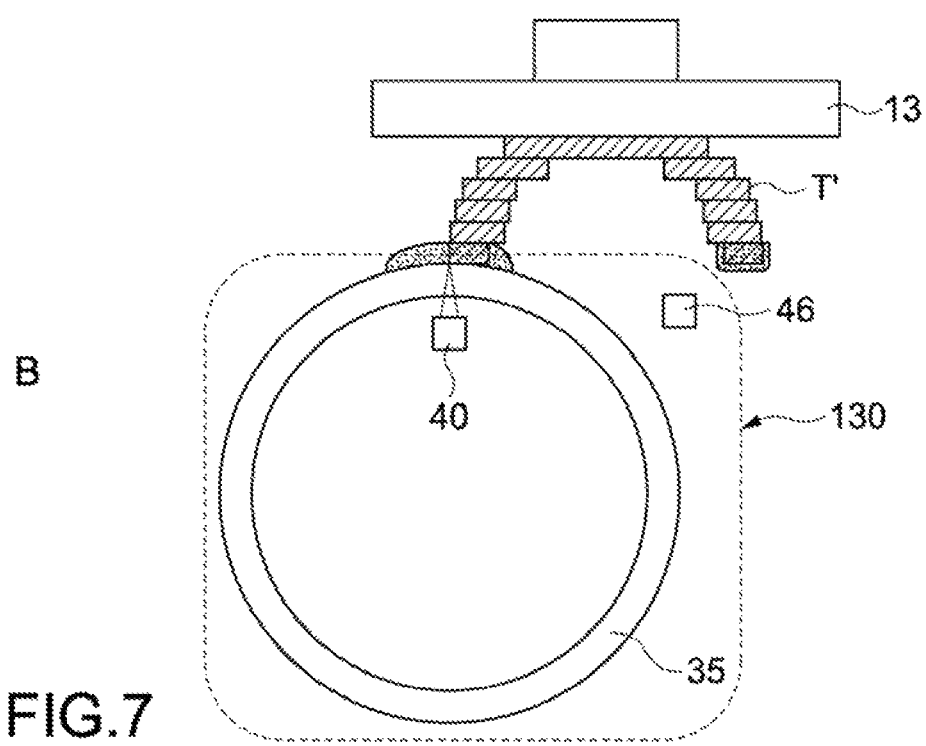
Figure 8:
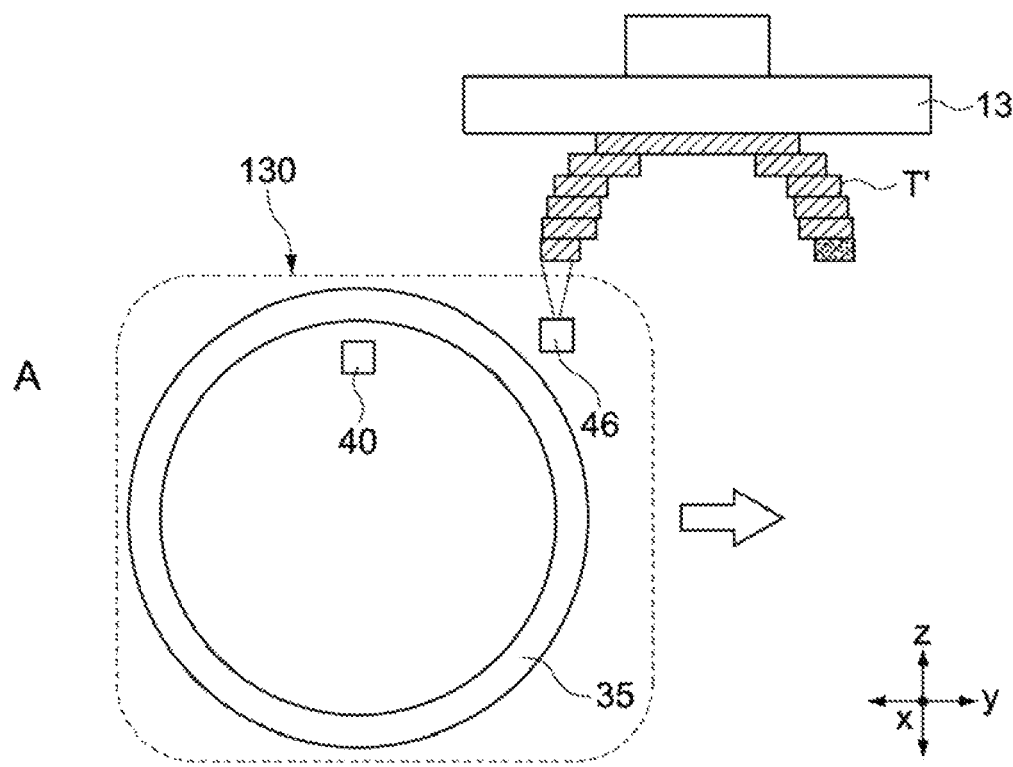
FIGS. 8A and 8B show operations of the modeling apparatus according to the second embodiment in sequence, following FIG. 7B.
Figure 8:
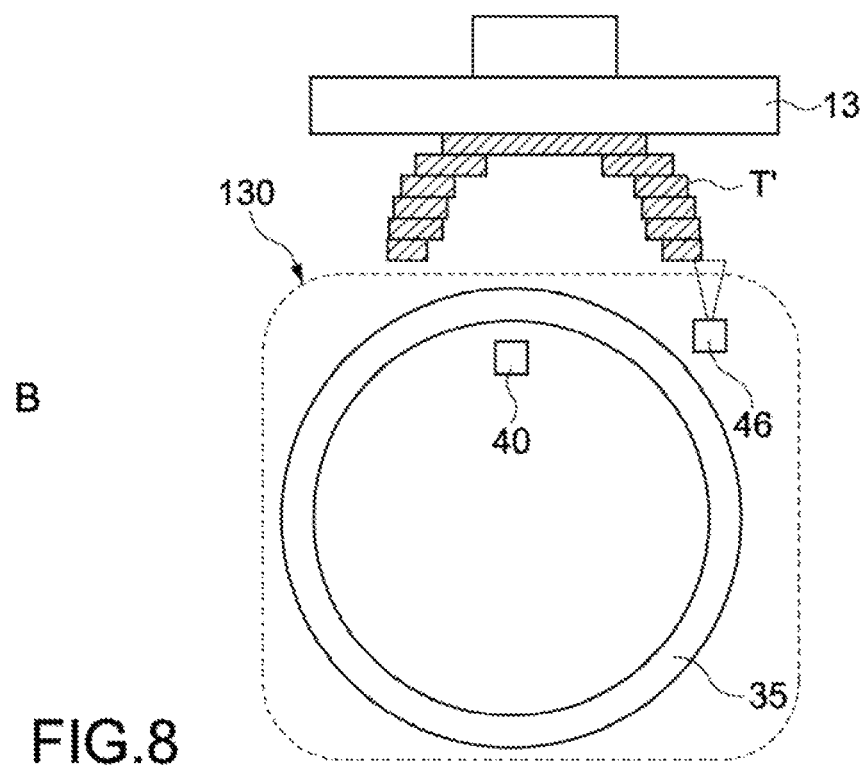

FIGS. 7A, 7B, 8A, and 8B show operations of the modeling apparatus according to the second embodiment in sequence and are diagrams as they are viewed in the x-direction. As shown in FIG. 7A, the exposure head unit 130 of this modeling apparatus further includes an additional irradiation unit (second irradiation unit) 46 in addition to the irradiation unit 40 (first irradiation unit) that performs selective exposure. Similar to the first irradiation unit 40, the additional irradiation unit 46 may include a one-dimensional LED array or may be a lump long in the x-direction that does not use the solid-state light-emitting elements.

The additional irradiation unit 46 may be disposed in any position as long as it is outside the drum 35, for example. Further, by the additional irradiation unit 46 being provided to be moved integrally with the exposure head unit 130, the efficiency of the modeling time is good. Further, in comparison with a case where an additional moving mechanism 20 is provided, it is possible to reduce the number of mechanisms and downsize the modeling apparatus.

When the selective exposure process for one or more, a predetermined number of layers is terminated as shown in FIGS. 7A and 7B, the uncured material remaining on the cured object T' is cured by the additional irradiation unit 46 as shown in FIGS. 8A and 8B in sequence.

In this case, the modeling apparatus may perform the selective exposure process shown in FIGS. 7A and 7B during forward scanning in the y-direction and post curing (additional irradiation) shown in FIGS. 8A and 8B may be performed during backward scanning in the y-direction. With this, the modeling time can be shortened.

By the post curing processing, the step of cleaning the modeled object with the solvent as described above also becomes unnecessary.

This embodiment may be combined with the first embodiment. For example, after the uncured material is removed by the plate-rotating mechanism 12 as shown in FIG. 5B, the post curing processing shown in FIG. 8 may be performed.

For example, also conceivable is a method in which, instead of performing exposure using an amount of light that enables the resin material to be completely cured during selective exposure, exposure is performed using a small amount of light that enables the resin material to maintain its shape and the entire resin material is additionally exposed to light for completely curing it after the all layers are modeled. However, in this case, due to the additional entire irradiation, the modeled object is completely cured, and hence the entire modeled object is contracted. A contraction rate of the entire modeled object is higher than a contraction rate of a cured object of a resin material of a predetermined number of layers that are not the entire modeled object. Thus, in this case, the modeling accuracy may be lowered.

In contrast, in the technology according to the second embodiment, the post curing processing is performed for each layer or every several layers, and hence a contracted layer is limited to the one layer or several layers of an uncompleted cured object T', a slightly thin layer. Thus, the change in dimension can be suppressed to minimum. With this, a high-quality modeled object can be formed at high accuracy. By combining the rotational removal according to the first embodiment with this second embodiment, it is possible to further enhance the accuracy of the modeled object.

The additional irradiation unit 46 may irradiate the resin material with light having an energy per unit time and per unit solid angle that is larger than an energy per unit time and per unit solid angle of the first irradiation unit 40.

Without providing the additional irradiation unit 46, the first irradiation unit 40 may perform irradiation for the post curing processing.

4. Third Embodiment

Figure 9:
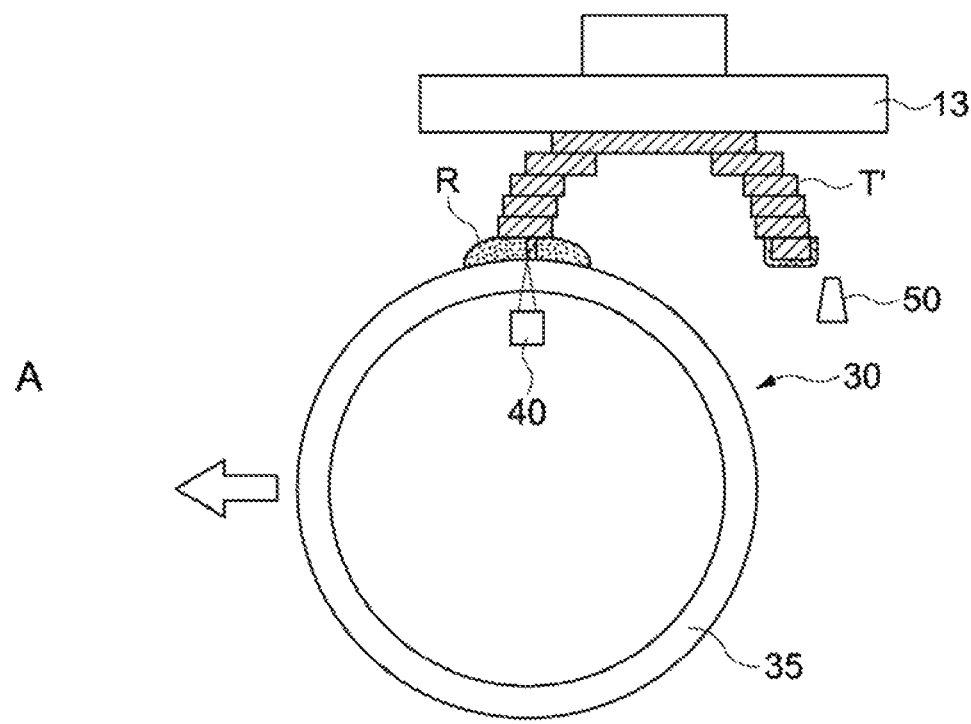
FIGS. 9A and 9B are diagrams as main parts of a modeling apparatus according to a third embodiment are viewed in the x-direction.
Figure 9:
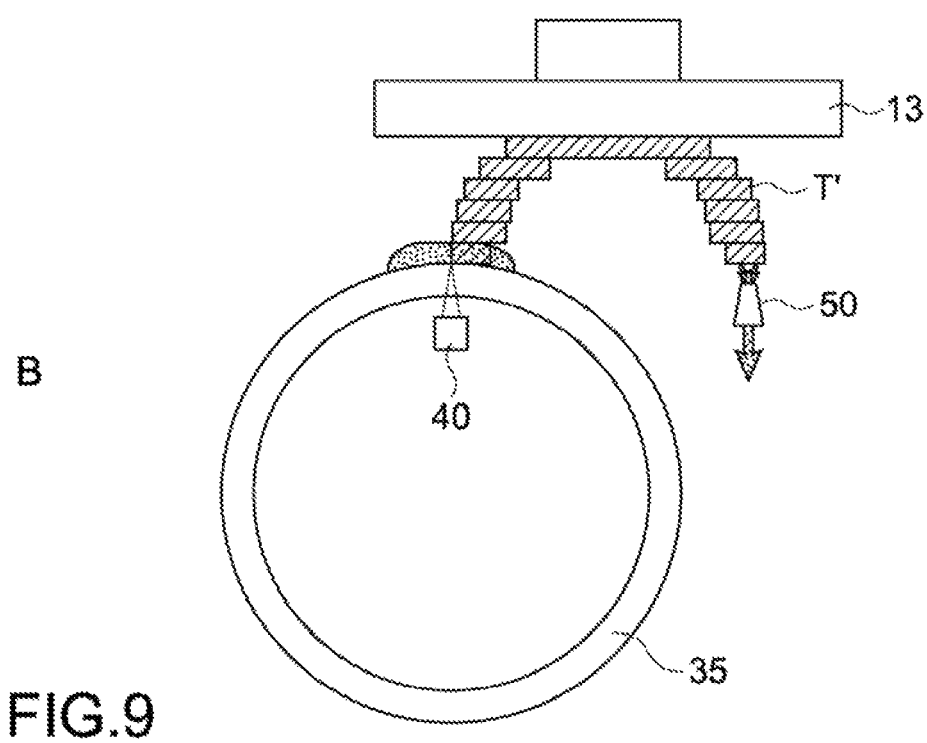

Each of FIGS. 9A and 9B is a diagram as main parts of a modeling apparatus according to a third embodiment are viewed in the x-direction. This modeling apparatus is provided with an absorption mechanism 50 serving as at least a part of the removing mechanism, which is movable integrally with the exposure head unit 30 or movable independently. The absorption mechanism 50 is connected to a pressure-reducing mechanism (not shown) and configured to absorb the uncured material.

For example, as shown in the figure, in the middle of the exposure process, that is, while the exposure head unit 30 is scanned and moved, the absorption mechanism 50 approaches the cured object T' and absorbs and removes the uncured material. With this, the modeling time efficiency can be increased.

A porous material may be used as another form of the absorption mechanism 50, for example, and the porous material may be configured to abut against the cured object. A mesh body or a sponge is used as the porous material.

If a flow channel structure is formed as the modeled object, there is also a method in which a hole for air pressure is provided in the work plate 13 and a compressed air or the like is directly fed to the flow channel of the modeled object from the hole.

A removing mechanism according to another form may remove the uncured material by blowing gas to the cured object by the use of an air blower or the like.

5. Fourth Embodiment

Figure 10:
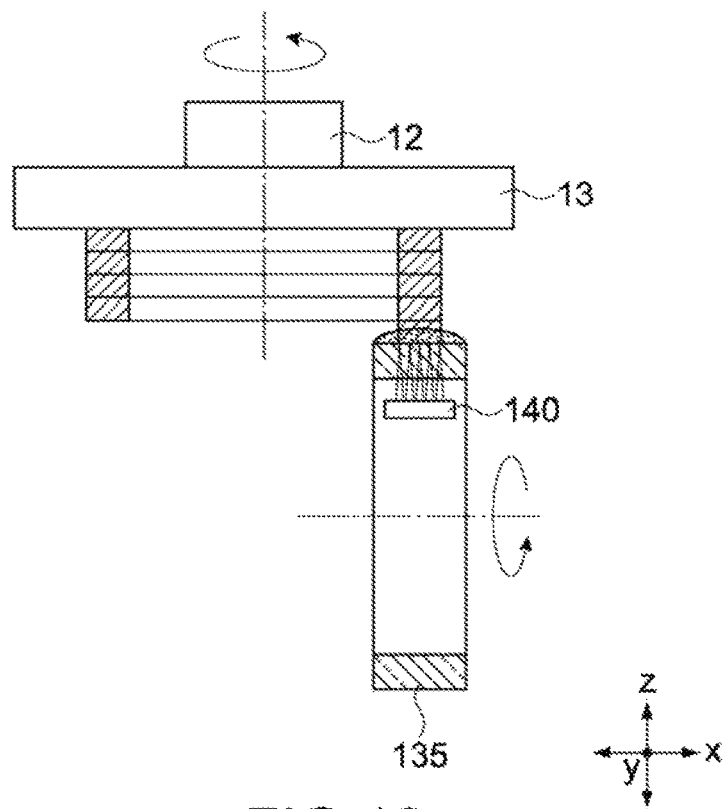
FIG. 10 shows main parts of a modeling apparatus according to a fourth embodiment.

FIG. 10 shows main parts of a modeling apparatus according to a fourth embodiment. This modeling apparatus uses, in the modeling apparatus 100 shown in FIG. 1, for example, a drum 135 formed having a small length. The length of the irradiation unit 140 is correspondingly small.

If the modeling apparatus forms, for example, a structure having a hollow pipe like shape, the drum 135 is not scanned in the x- and y-directions and made stationary. Then, while the plate-rotating mechanism 12 rotates the work plate 13 for each layer of the resin material, the irradiation unit 40 performs exposure. The work plate 13 is rotated by one turn for each layer. Exposure for one layer is completed. Then, the work plate 13 is lifted up by the z-movement mechanism 26, corresponding to the thickness of one layer. The modeling apparatus repeats the steps in sequence.

The general modeling apparatus requires scanning in the x- and y-directions. However, the modeling apparatus according to this embodiment is capable of forming the modeled object only by rotating the work plate 13. It is possible to form a modeled object having a cylindrical or container shape in a short time. Further, the configuration of the modeling apparatus can be simplified and it is possible to realize downsizing of the modeling apparatus.

Figure 11:
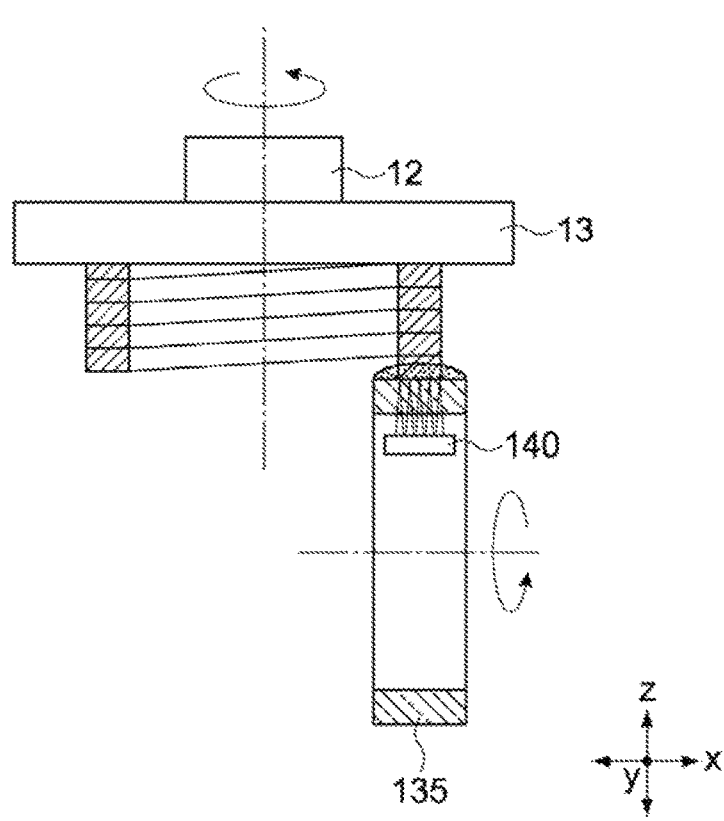
FIG. 11 shows another method of manufacturing a hollow pipe-like structure shown in FIG. 10.

FIG. 11 shows another manufacturing method for the structure having a hollow pipe like shape shown in FIG. 10. The modeling apparatus according to this embodiment rotates the work plate 13 by the use of the plate-rotating mechanism 12, continuously rotates it, and also continuously moves the work plate 13 by the use of the z-movement mechanism 26, to thereby stack a resin material in a helical form while the irradiation unit 140 exposes the resin material to light. Also in this case, exposure is performed while the drum 135 is made stationary. In this embodiment, in comparison with the manufacturing method shown in FIG. 10, the modeling time can be further shortened.

Note that, in this case, it is only necessary to appropriately set the supply timing of the resin material.

FIGS. 12A and 12B show a method of manufacturing another modeled object by this modeling apparatus. This modeled object T is a hollow spherical body (or a container using a spherical shape). The modeling apparatus exposes the resin material to light and stacks the cured object layer by layer while the work plate 13 is rotated by the plate-rotating mechanism 12 and the exposure head unit is rotated by the θ-rotation mechanism 14 (see FIG. 1). That is, by appropriately changing the stacking direction of the resin material for each layer or every two or more, predetermined number of layers, it is possible to efficiently form a spherical surface or curved surface shape.

In this case, as shown in FIG. 11, the modeling apparatus may continue the rotation of the work plate 13 and stack the cured object in a helical form.

According to such a manufacturing method, a structure with a spherical surface or curved surface having a free curvature can be formed in a short time.

The structures shown in FIGS. 10, 11, 12A, and 12B have a rotational symmetrical shape. However, as a matter of course, the modeling apparatus shown in FIG. 10 is capable of forming a structure not having the rotational symmetrical shape by combining the plate-rotating mechanism 12 with the operations of the θ-rotation mechanism 14, the x-movement mechanism 22, and the y-movement mechanism 24.

Figure 13:
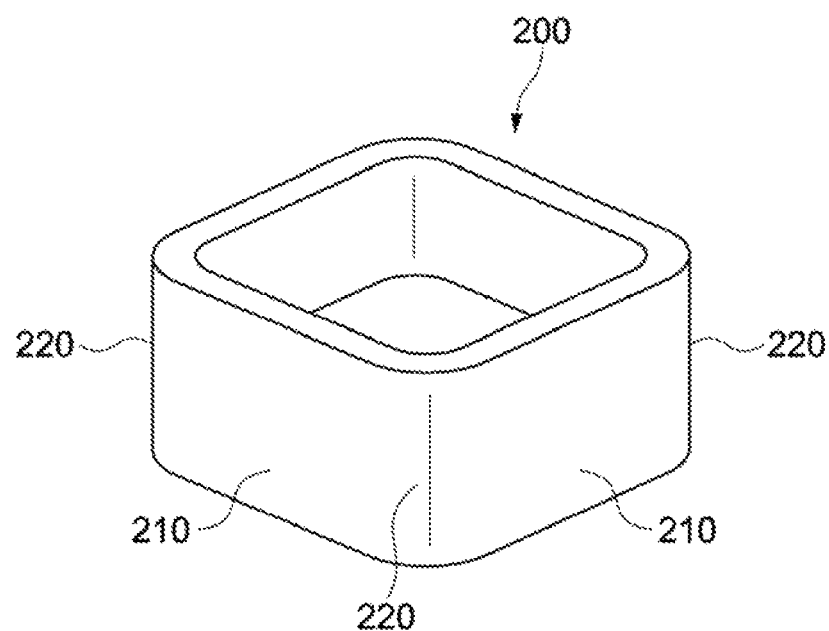
FIG. 13 is a perspective view showing a structure not having a rotational symmetrical shape.

FIG. 13 is a perspective view showing such a structure. The modeling apparatus is capable of forming a structure having a non-rotational symmetrical shape that is a container shape 200 including side walls 210 having flat surfaces and curved surfaces (R) 220 at four corners. For example, the modeling apparatus is capable of forming the side walls 210 having the flat surfaces by operating the x-movement mechanism 22 and the y-movement mechanism 24 (see FIG. 1), and is capable of forming portions of the curved surfaces 220 by operating the plate-rotating mechanism 12.

Note that, also in this case, the modeling apparatus may stack the resin material for each layer as shown in FIG. 10 or may stack the resin material in a helical form as shown in FIG. 11.

Figure 12:
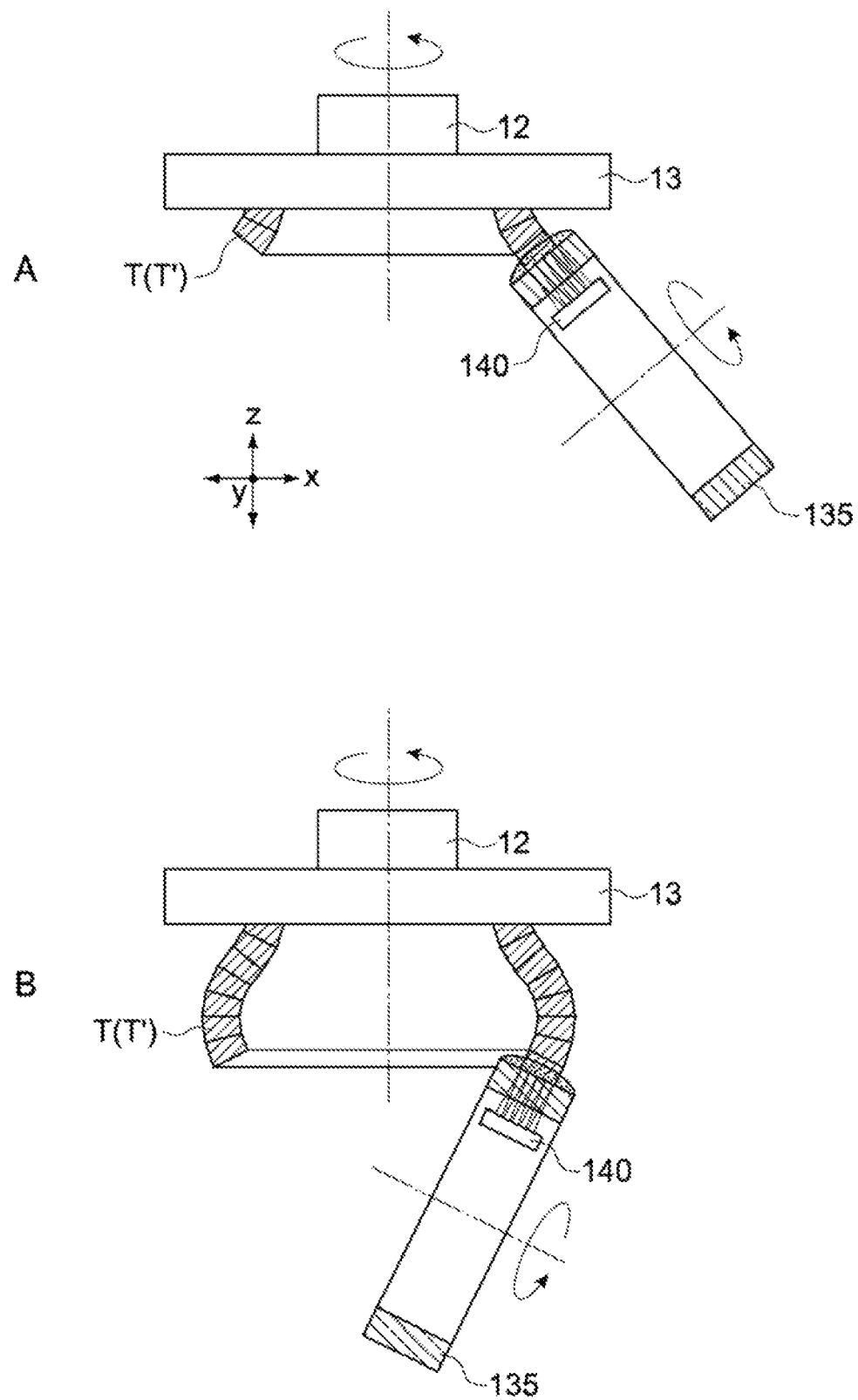
FIGS. 12A and 12B show a method of manufacturing another modeled object by this modeling apparatus.

As a matter of course, the structures shown in FIGS. 10 to 12 can be formed also by the modeling apparatus including the drum 35 having a long shape as shown in FIG. 1.

As described above, in optical modeling using a one-dimensional regulated liquid level method, a resin material is trapped due to a physical phenomenon, and hence the degree of freedom of the attitude of a modeling surface is high. That is, modeling can be performed in any attitude, for example, on a floor surface, a wall surface, and a ceiling surface. Therefore, the modeling apparatus can be variously devised and a high degree of freedom of the shape of the modeled object is provided.

Further, the modeling apparatus using the one-dimensional regulated liquid level method is capable of forming a finely controlled, elaborate three-dimensional mesh structure. As an application example thereof, manufacture of a light-weight, highly rigid structural member is conceivable. Such a structure is formed in a hollow pipe shape or spherical shape as described above. According to the one-dimensional regulated liquid level method, the configuration of the modeling apparatus shown in FIGS. 1 and 10 that is suitable for creating such a hollow pipe or spherical shaped structure can be realized.

Figure 14:
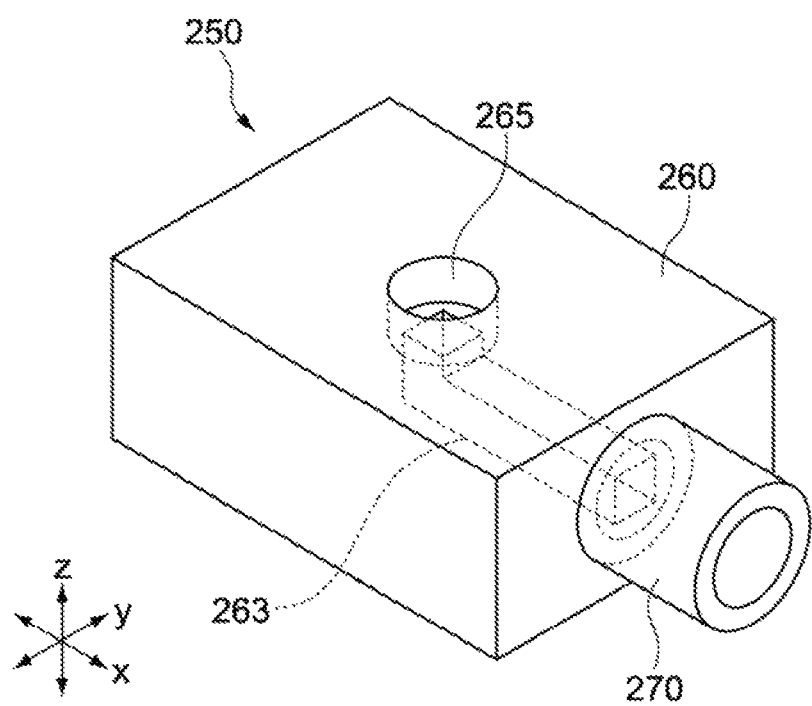
FIG. 14 is a perspective view showing a structure including a micro flow channel that can be formed by the modeling apparatus shown in FIG. 1 or 10.

FIG. 14 is a perspective view showing a structure including a micro flow channel that can be formed by the modeling apparatus shown in FIG. 1 or 10.

This structure 250 includes a main body 260 having a rectangular parallelepiped shape and a hollow pipe-like boss portion 270 provided in a side surface of this main body 260. The main body 260 includes a hole 265 provided on an upper surface thereof and an L-letter-like flow channel 263 that communicates with the inside of the boss portion 270 from the bottom portion of this hole.

A specific method of manufacturing this structure by the modeling apparatus is a method as follows. Here, the manufacturing method by the modeling apparatus 100 shown in FIG. 1 will be described. The modeling apparatus 100 forms, by movement of the irradiation unit 40 in the y-direction and movement in the z direction for stacking the cured object for each layer, the main body 260 including the flow channel 263 and the hole 265 (see FIG. 15A).

Next, the modeling apparatus 100 rotates, by the use of the θ-rotation mechanism 14 (there is a case where the x-movement mechanism 22 is further used in addition to this), the exposure head unit 30 such that the longitudinal direction of the irradiation unit 40 is oriented in the z direction. Then, the modeling apparatus 100 forms this boss portion 270 from the side surface of the main body 260 by stacking along an axis direction (x-direction) of the boss portion 270 for each layer (see FIG. 15B).

Figure 16:
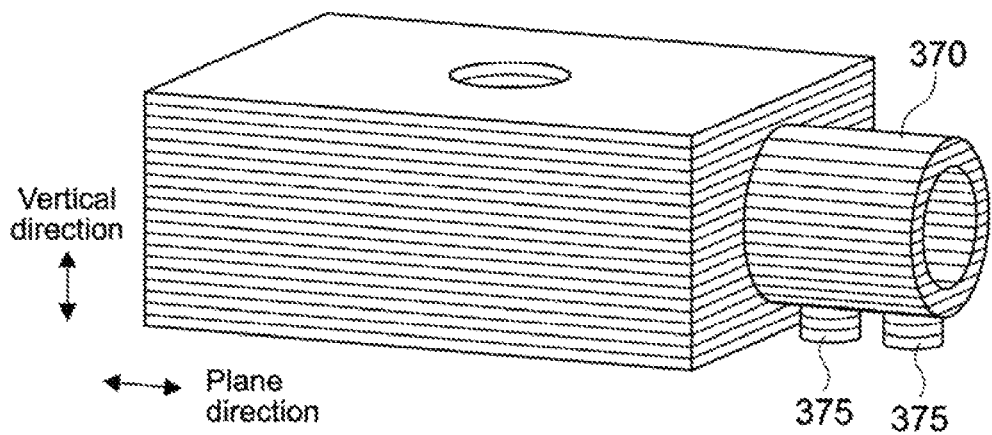
FIG. 16A is a perspective view showing the same structure as the structure shown in FIG. 14, which is formed according to a normal modeling method as a reference example.
FIG. 16B shows a boss portion of the structure.
Figure 16:
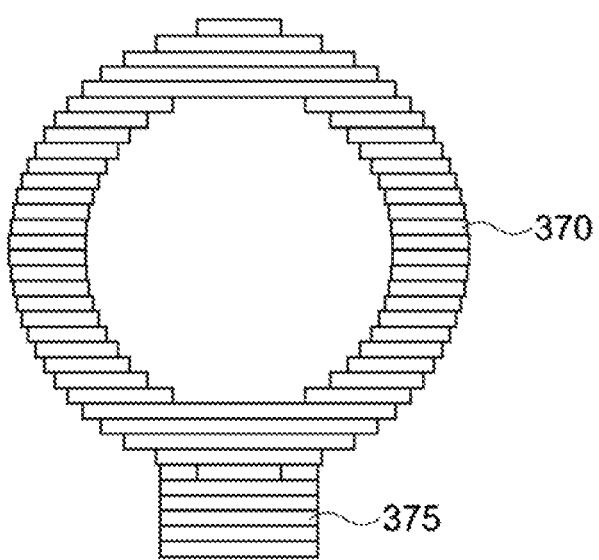

FIG. 16A is a perspective view showing the same structure as the structure shown in FIG. 14, which is formed according to a normal modeling method, by x, y-scanning (plane scanning) and stacking (vertical stacking) of the resin material in a direction perpendicular to a plane thereof, as reference examples. FIG. 16B shows the boss portion of the structure.

In the modeling method using plane scanning and vertical stacking, the resolution in the plane and the resolution in the vertical surface are different. The resolution in the vertical surface depends on the thickness (stacking pitch) of each layer of the resin material. Thus, modeling can be performed at high speed by increasing the resolution in the plane and increasing the stacking pitch. However, in this case, a resolution parallel to the plane in the modeled object is high while a resolution of a surface vertical to it is low. Therefore, depending on the shape of the modeled object, there is a case where modeling cannot be performed at high speed and a necessary accuracy cannot be obtained.

In such a micro flow channel structure, the shape accuracy of the flow channel and the boss portion becomes important. As shown in FIG. 16B, a side surface shape of a boss portion 370 and an inner surface shape of the hole are influenced by a low resolution in the vertical surface and formed in a step form. In the case of the boss portion, originally, a high resolution in the vertical surface is necessary and the resolution in the plane is unnecessary. However, the normal modeling method cannot change the stacking direction, and hence the boss portion 370 is formed by stacking it in the vertical direction.

Figure 15:
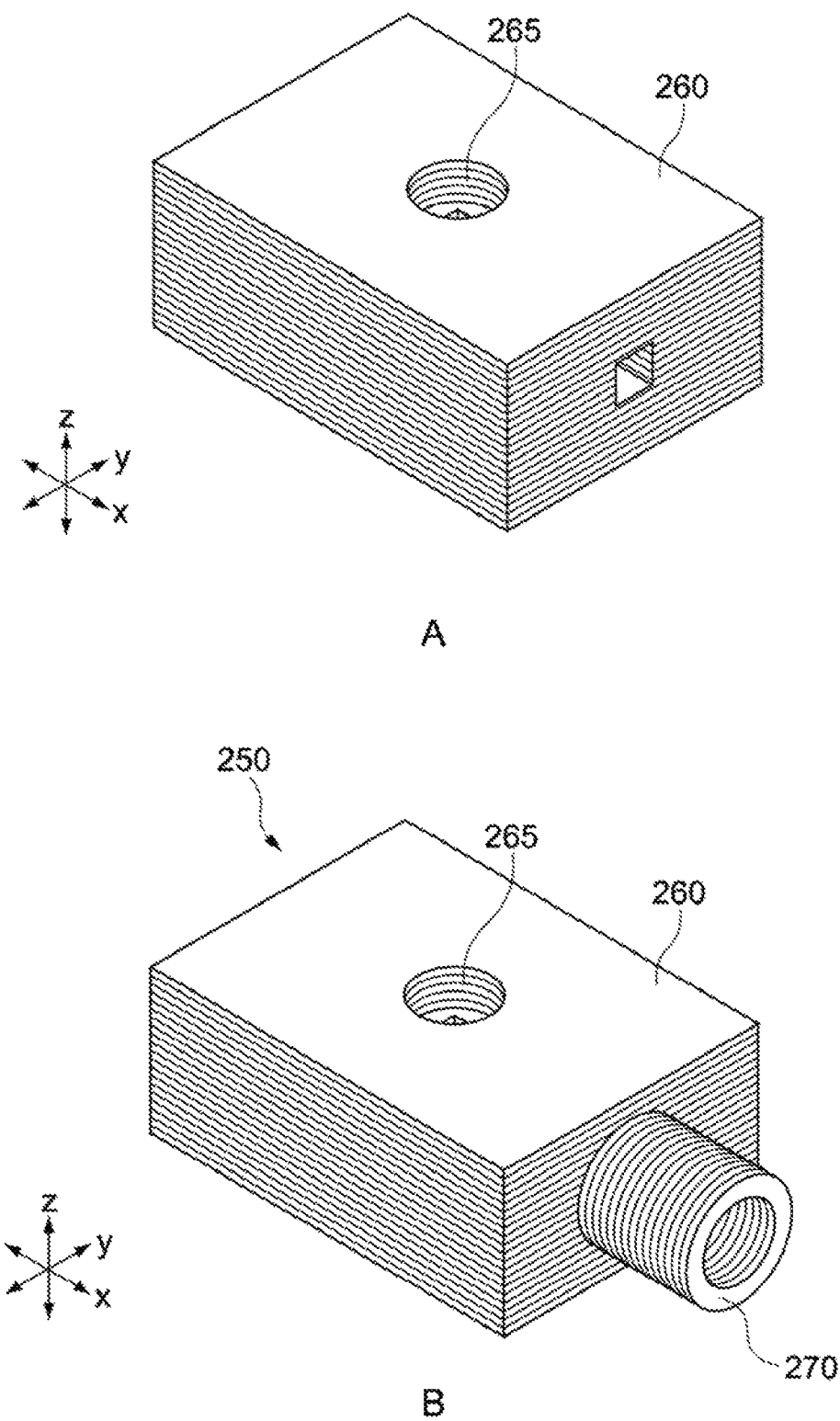
FIGS. 15A and 15B are diagrams describing a method of manufacturing the structure shown in FIG. 14.

In contrast, as shown in FIG. 15B, the modeling apparatus according to this embodiment 100 is capable of separately forming the main body 260 at an increased resolution in the plane and the boss portion 270 at an increased resolution in the vertical surface. In this manner, in this embodiment, the modeled object can be formed by appropriately changing the stacking direction depending on the direction in which a high resolution is required.

Further, the structure in the example shown in FIG. 16B includes a supporting portion 375 that supports the boss portion 370. In general, in the case of stacking modeling only in the vertical direction, in the case of modeling a region of an upper layer in a wider range than a modeling range of a lower layer, that is, in the case where an overhang like the boss portion 370 is present, such a supporting portion 375 is essential. Further, there is a case where this supporting portion 375 is removed after modeling is terminated, and hence it takes a long time to complete the structure.

In contrast, the modeling apparatus according to this embodiment 100 can appropriately change the stacking direction, and hence it becomes unnecessary to form the supporting portion 375. With this, the modeling time can be shortened.

Figure 17:
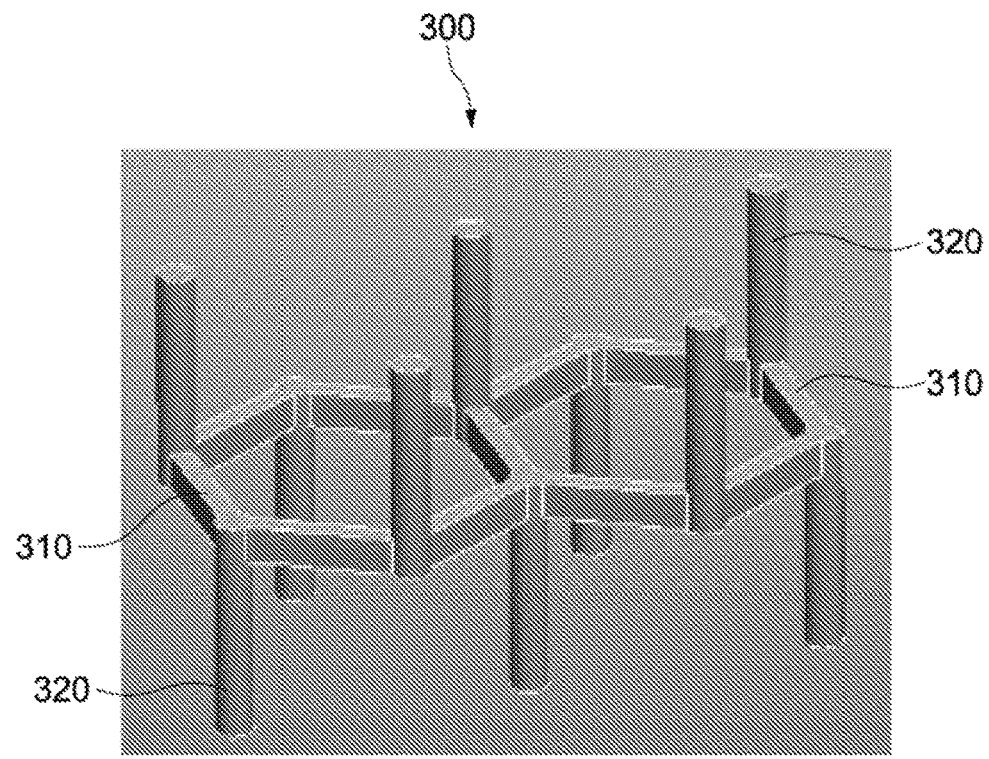
FIG. 17 is a perspective view showing a unit cell structure for forming a three-dimensional mesh structure.

FIG. 17 is a perspective view showing a unit cell structure for forming a three-dimensional mesh structure.

The modeling apparatus according to the present technology can form a minute, elaborate, and three-dimensional mesh structure with this unit cell structure 300 being a basic structure. The unit cell structure 300 includes honeycomb structures 310 provided in a first direction (e.g., horizontal direction) and connection structures 320 provided in a second direction (e.g., vertical direction) different from the first direction and links the honeycomb structures 310. The connection structures 320 are formed of rod-like members, for example.

A three-dimensional mesh structure constituted of such a unit cell structure 300 has characteristics that the rigidity in upper and lower directions is low while the rigidity in the horizontal direction is high. That is, a three-dimensional mesh structure has an anisotropy of rigidity. By positively utilizing the anisotropy in this manner, it is possible to realize a high-function easy to be contracted in one direction.

The unit cell structure 300 shown in FIG. 17 is a structure having a rigidity in one direction, and hence relatively easy to be manufactured even according to the modeling method using the stacking direction that is only one direction. However, modeling takes a long time in the case where, for example, rigid structures in a plurality of different directions, for example, honeycomb structures in a plurality of different directions are formed according to a general modeling method using only one stacking direction. In contrast, in accordance with the modeling apparatus according to the present technology, the stacking direction is free, and hence it becomes possible to form them in a short time.

Further, the modeling apparatus according to the present technology is capable of easily forming a structure having not only the anisotropy of rigidity but also electromagnetic properties, optical properties. They can be applied to the field of meta-materials.

6. Fifth Embodiment

Figure 18:
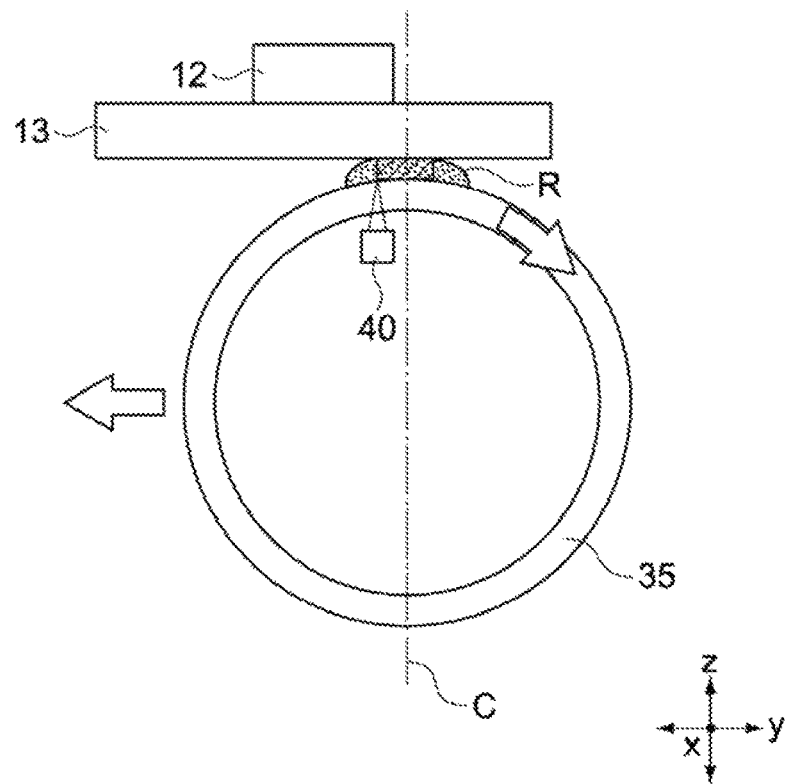
FIG. 18 shows main parts of a modeling apparatus according to a fifth embodiment.

FIG. 18 shows main parts of a modeling apparatus according to a fifth embodiment.

An irradiation unit 40 according to this modeling apparatus is arranged to radiate light to the resin material R in a position deviated in the y-direction from the minimum gap g (see FIG. 2) where the distance between the drum 35 and the stage is minimum. A center line C on the z axis that extends through the minimum gap is a line along a radius of the cylinder of the drum 35. The position of the irradiation unit 40 is set such that the irradiation position is deviated from the center line C in the y-direction. The irradiation position is on a side such that a portion of the drum 35, which is located on the center line C, is moved away from the irradiation position (in figure, on left side with respect to center line C).

By setting the irradiation position of the irradiation unit 40 to be deviated from the center line C in this manner, the following merit is provided.

For example, a case where the resin material having a relatively high contraction rate in curing is used will be assumed. As the contraction rate of the resin material becomes higher, in the position of the minimum gap, after contraction of the resin material, surrounding uncured resin material (hereinafter, referred to as resin liquid) flows between the contracted material and the surface of the drum 35 due to the capillary force and incompletely cured. As a result, there is a case where a highly accurate cured surface cannot be formed.

Alternatively, when the resin material is contracted in the minimum gap position, if the viscosity of the resin liquid or the frictional force of the resin liquid with respect to the surface of the drum 35 is larger than the capillary force acting on the resin liquid as described above, the resin liquid is not moved to the minimum gap position. In this case, the region having a volume corresponding to an amount of contraction of the resin material becomes vacuum. When the vacuum region is formed, there is a fear that a highly accurate modeled object cannot be formed.

In the modeling apparatus according to this embodiment, the resin material R in the position deviated from the minimum gap position is contracted, and hence the thickness of the cured object after contraction becomes substantially the same thickness as (or a slightly smaller thickness than) the minimum gap. That is, the irradiation position is set in the position deviated from the minimum gap such that the thickness of the cured object after contraction is substantially the same thickness as the minimum gap.

With this, it is possible to suppress inflow of the resin liquid in the minimum gap position and generation of the vacuum region and to form a highly accurate modeled object.

Further, by increasing a degree of contraction of the resin material in a thickness direction in this manner, provided is an effect that contraction in the plane perpendicular to the thickness direction is correspondingly suppressed.

Figure 19:
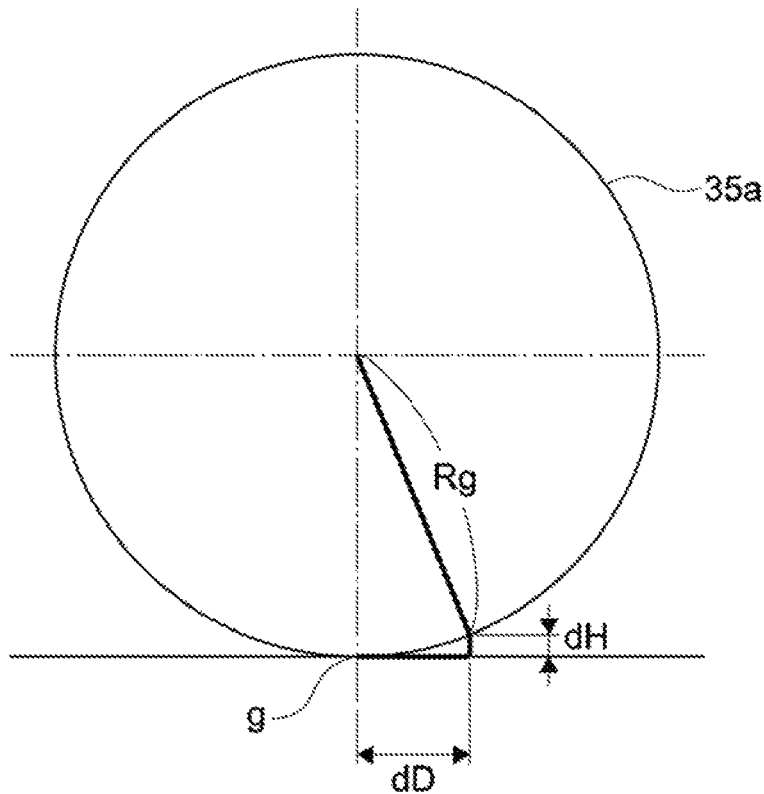
FIG. 19 is a diagram for quantitatively describing an amount of deviation from a position of a minimum gap in an irradiation position.

FIG. 19 is a diagram for quantitatively describing the amount of deviation of the irradiation position from the position of the minimum gap g.

The circle in the figure is a circle indicating the surface 35a of the drum 35. An amount of deviation dD from the position of the minimum gap is determined. Note that dD<Rg.

α: contraction rate of resin material in thickness direction
dH: contraction thickness of resin material
Ht: target film thickness of resin material
Rg: radius of cylinder The contraction of the resin material can be expressed by Expression (1) below.

[Expression 1]

$$dH = Ht\left(\frac{1}{1-\alpha} - 1\right) \quad \text{Expression (1)}$$

In the geometry, Expression (2) below can be obtained from FIG. 19.

[Expression 2]

$$dH = \frac{dD^2}{2 \times Rg} \quad \text{Expression (2)}$$

Based on Expressions (1) and (2) above, Expression (3) below can be obtained.

[Expression 3]

$$dD = \sqrt{2 \times Rg \times Ht \times \left(\frac{1}{1-\alpha} - 1\right)} \quad \text{Expression (3)}$$

Figure 20:
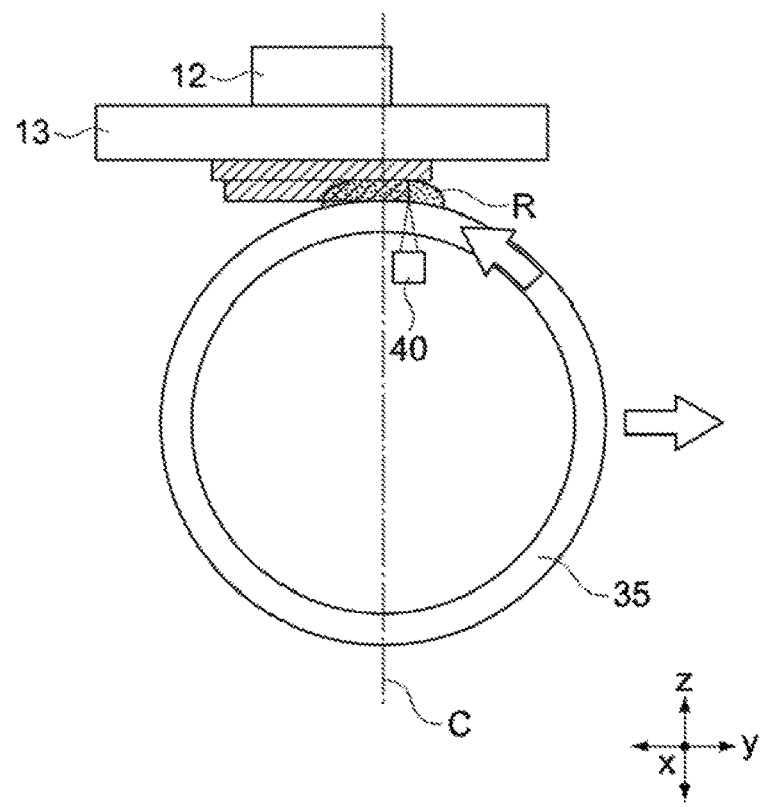
FIG. 20 shows a modified example of the fifth embodiment.

FIG. 20 shows a modified example of the fifth embodiment. In the example shown in FIG. 18, in the case where the position of the irradiation unit 40 with respect to the drum 135 in the y-direction is fixed, scanning for modeling in the y-direction is limited to one way. In view of this, the modeling apparatus according to the example shown in FIG. 20 includes a mechanism (irradiation position-moving mechanism) that moves the irradiation unit 40 with respect to the drum 35 in a direction (y-direction) orthogonal to the longitudinal direction of the irradiation unit. With this, by alternately changing the position of the irradiation unit 40 in the y-direction while sandwiching the center line C between forward and backward ways in the y-direction, exposure processing can be performed in the forward and backward ways. As a result, in comparison with the example shown in FIG. 18, the modeling time can be shortened.

Further, by such a mechanism, the modeling apparatus is capable of ensuring an optimum irradiation position in the y-direction depending on the stacked-film thickness of the resin material. For example, in the case where the stacked-film thickness is changed in the step of forming one or more modeled objects, an optimal value of the irradiation position can be selected depending on the set stacked-film thickness.

7. Sixth Embodiment

In general, the modeled object is formed of one material in the stacking modeling. If the modeled object can be formed of a plurality of materials, it is conceivable that the functions of the modeled object are increased and the range of uses thereof is widened. It is an object of a technology according to the sixth embodiment to provide a modeling apparatus capable of using a plurality of materials and a method of manufacturing the modeled object.

Figure 21:
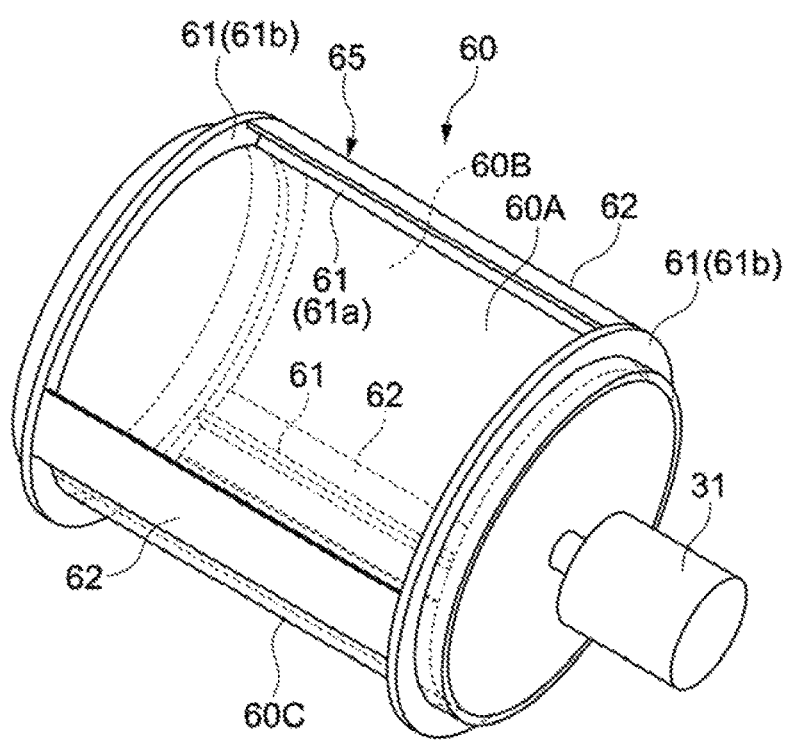
FIG. 21 is a perspective view showing a drum used in a modeling apparatus according to a sixth embodiment.
Figure 22:
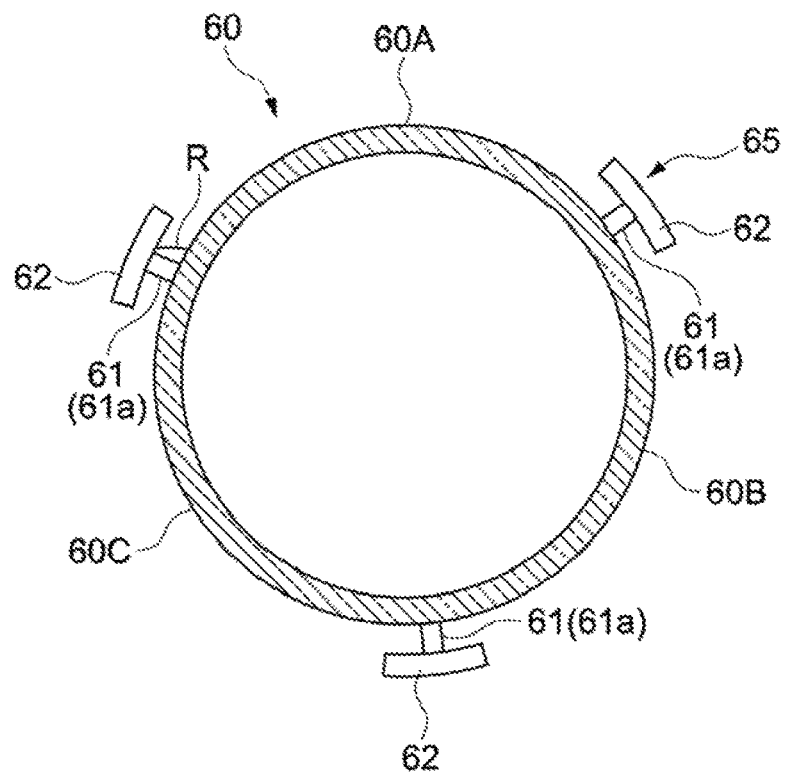
FIG. 22 is a sectional view of the drum shown in FIG. 21.

FIG. 21 is a perspective view showing a drum used in the modeling apparatus according to the sixth embodiment. FIG. 22 is a sectional view of this drum 60.

This drum 60 includes the surface partitioned into a plurality of regions 60A, 60B, 60C and is opposed to the work plate 13 (see FIG. 1) such that the retention region of the resin material is formed between an one region of those regions and the work plate 13.

For example, the surface of the drum 60 is provided with a partitioning member 65 including a partition wall 61 for forming those regions. The partition wall 61 includes, for example, rib portions 61a provided extending along the longitudinal direction of the drum 60 and ring portions 61b provided along a circumferential direction of the surface of the drum 60. The regions 60A, 60B, 60C are defined by the rib portions 61a and the ring portions 61b.

Top ends of the rib portions 61a are provided with flange portions 62 over their longitudinal direction. A protruding direction of the flange portions 62 is a circumferential direction. With this flange portion 62, the resin material R can be stored in a space surrounded by the drum 60 surface, the rib portions 61a, and the flange portions 62. It is possible to prevent the resin material R from falling and being mixed into other resin materials.

In the example shown in the figure, the regions 60A, 60B, 60C are configured by being divided by 120° along the circumferential direction of the drum 60, that is, into three equal parts. However, as a matter of course, they may be divided into two equal parts or four or more parts. Further, the regions may be unevenly divided.

The modeling apparatus performs printing in the regions 60A, 60B, 60C by, for example, using a plurality of different materials. As the plurality of different materials, there are, for example, a viscous material, a plurality of materials having different dielectric constants, a conductive material, and a non-conductive material.

For example, the modeling apparatus causes the first region 60A of the plurality of regions 60A, 60B, 60C to be opposed to the surface of the work plate and supplies the first material to the retention region formed between the first region 60A and the surface of the drum 60. Then, the modeling apparatus forms a first portion of the modeled object from the first material. Next, by rotating the drum 60, the second region 60B of the plurality of regions is opposed to the surface of the work plate and the retention region formed therebetween is supplied to the second material. Then, the modeling apparatus forms a second portion of the modeled object from the second material.

According to such modeling apparatus and manufacturing method, it is possible to manufacture a high-function structure in which a plurality of materials are integrated, at high accuracy.

In order to use a plurality of resin materials, for example, as described in FIGS. 18 and 19 of Patent Document 1, it is conceivable to use a plurality of drums and changes the drum for each material. However, in this case, an increase of size of the modeling apparatus is inevitable. In accordance with this embodiment, while realizing downsizing of the modeling apparatus, it is possible to form a high-function structure in which a plurality of materials are integrated.

8. Seventh Embodiment

It is an object of a technology according to a seventh embodiment to provide a method of manufacturing a high-function structure using a plurality of materials and provide the structure. The present technology is a technology of "controlled impregnation" that voluntarily controls an aperture to be filled with the resin material and an aperture not to be filled therewith out of a plurality of apertures in the structure.

Figure 23:
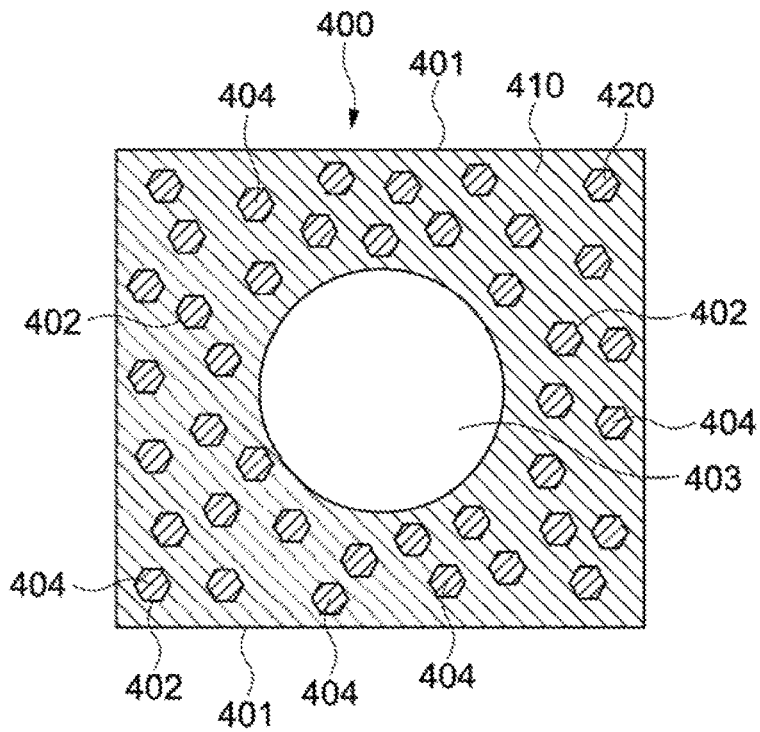
FIG. 23 is a sectional view schematically showing a structure according to an embodiment of the present technology.

FIG. 23 is a sectional view schematically showing a structure manufactured according to the present technology in order to describe the outline of the present technology. This structure (modeled object) 400 is formed of a plurality of materials, for example, two kinds of materials. A portion 410 formed of the first material of the structure 400 includes an outer surface 401, a plurality of minute apertures (first aperture) 402, an aperture (second aperture) 403 having a large capacity than that of the minute apertures 402, and a communication channel (not shown) that causes the minute apertures 402 and the outer surface 401 to communicate with each other. Portions 420 formed of the second material different from the first material are filled portions 404 filled in the communication channel and the minute apertures 402.

For example, the size (diameter, etc.) of the minute apertures 402 is approximately several tens to several hundreds of μm and an aperture 403 is, for example, several mm or more. The size of the minute apertures 402 is approximately set depending on the kind of the second material to be used.

The minute apertures 402 may be configured using, typically, for example, the unit cell structure 300 as shown in FIG. 17. That is, the first material that forms the minute apertures 402 is a frame of the unit cell structure 300 and only needs to be a three-dimensional mesh structure.

The aperture 403 is an aperture that the structure 400 inherently has due to design, and is an aperture for realizing a hollow structure.

The method of manufacturing the structure 400 is as follows. For example, any one of the modeling apparatuses according to the above-mentioned embodiments forms the modeled object of the structure, which is formed of the first material. As the first material, for example, the light-curable resin is used. This modeled object formed of the first material is impregnated with, for example, a liquid second material. Then, the second material flows into the minute apertures 402 due to the capillary force from the outer surface 401 via the communication channel. With this, the filled portions 404 are formed.

The aperture 403 has a large capacity. Therefore, the second material is not fully filled in the aperture 403 and the second material adheres only to the surface (inner surface) of the aperture 403, for example. For example, in the case where a thermosetting resin or the like is used as the second material, by performing heat treatment after impregnation of the second material of the modeled object formed of the first material, the second material is cured (becomes solid) and the structure is completed.

It is unnecessary to use the light-curable resin as the second material, and the range of selection of the material is widened. Thus, a high-function structure can be realized. As the second material, a material having a lower viscosity than that of the first material or an inexpensive material may be used. Alternatively, by using a material having a smaller specific gravity than that of the first material as the second material, it is possible to achieve a reduction in weight of the structure and make the rigidity of the structure height in comparison with the case where the aperture 403 is not filled with anything. Thus, it is possible to realize both of high rigidity and reduction in weight.

In this embodiment, in the portion 410 formed of the first material, the communication channel (first communication channel) that causes the outer surface 401 and the aperture 403 to communicate with each other and the communication channel (second communication channel) that causes the minute apertures 402 and the aperture 403 to communicate with each other may be formed. In the case where the modeled object formed of the first material is impregnated with the second material, the second communication channel and the minute apertures 402 are filled with the second material via the first communication channel and the aperture 403 from the outer surface 401.

In addition to the structure of such a structure, the communication channel that causes the minute apertures 402 and the outer surface 401 to communicate with each other as described above may be provided.

9. Eighth Embodiment

In general, as the structure formed by the modeling apparatus, it is possible to apply a wide range of size from a size that can be held by the hand of a person to, for example, a size like the body of an automobile. However, as the size of the structure increases, it is necessary to correspondingly increase the modeling stage, and the modeling apparatus is inevitably increased in size. It is an object of a technology according to an eighth embodiment to provide a modeling apparatus capable of forming a structure having any size without increasing the size of the modeling apparatus.

Figure 24:
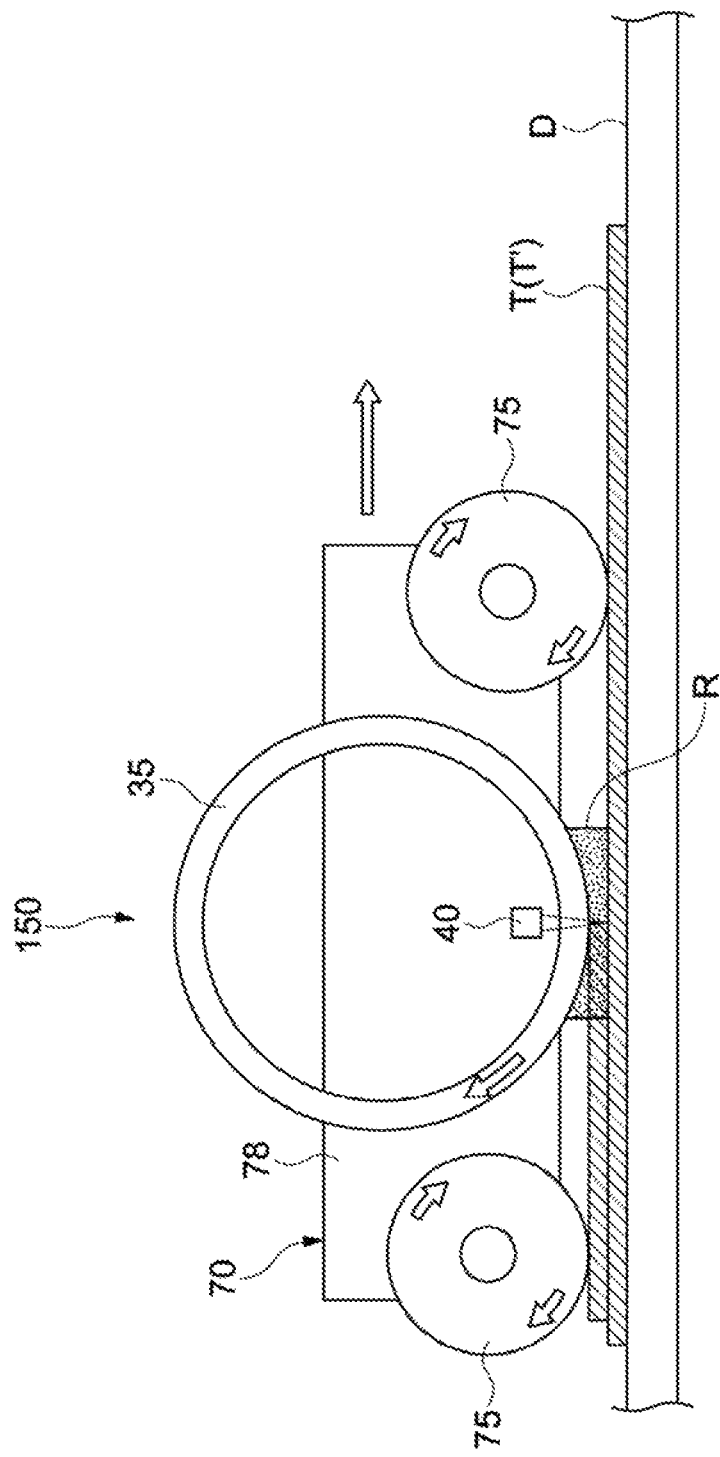
FIG. 24 is a side view showing a modeling apparatus according to an eighth embodiment.

FIG. 24 is a side view showing a modeling apparatus according to the eighth embodiment.

This modeling apparatus 150 includes a drum 35 that can be arranged to be opposed to a modeling target surface D and a traveling body 70 that incorporates this drum 35 and is travelled on the modeling target surface D. The traveling body 70 includes a main body 78 and two pairs of (a total of four) wheels 75, for example, that is rotatably connected to the main body 78.

The drum 35 is mounted on the main body 78 to be rotatable through the motor (not shown). In the drum 35, an irradiation unit 40 as in each of the above-mentioned embodiments is provided. The main body 78 incorporates a moving mechanism (not shown) that moves the drum 35 in the stacking direction of the resin material and controls a distance between the modeling target surface D and the surface of the drum 35.

In the figure, the rotation axes of the left and right wheels 75 have different heights. This is for overcoming differences in shape of the cured object T', the number of layers being modeled, and the like in the left and right directions in the figure (traveling direction of the traveling body 70). A spring and the like are used as the mechanism that overcomes a difference in height of such wheels 75.

The modeling target surface D is a target surface on which the modeled object T is formed and a surface on which the traveling body 70 can be moved, any area and length can be used.

By the traveling body 70 traveling by itself in this manner, it is possible to form a structure having a larger size than that of the modeling apparatus. That is, without increasing the size of the modeling apparatus, the structure of any size can be formed.

As an application example, this modeling apparatus is capable of forming, for example, a material of a wall or the like of a building. For example, with a structural object formed by the modeling apparatus itself being a reference and an upper surface of the structural object as the reference being the modeling target surface D, the material can be stacked.

10. Other Embodiments

The present technology is not limited to the above-mentioned embodiments and other various embodiments can be realized.

In the above-mentioned embodiments, the x-movement mechanism 22 and the y-movement mechanism 24 are mechanisms that move the exposure head unit 30 and the z-movement mechanism 26 is the mechanism that moves the work plate 13. However, it is not limited to such a configuration and the x and y-movement mechanisms 24 may be mechanisms that move the work plate 13 or the z-movement mechanism 26 may be a mechanism that moves the exposure head unit 30. That is, movement between the exposure head unit 30 and the work plate may be relative.

The irradiation unit according to each of the above-mentioned embodiments radiates light as an energy ray. As other energy rays, for example, ultraviolet waves or electronic rays may be used.

As the irradiation unit according to each of the above-mentioned embodiments, the one including the LED array is used. However, it is not limited thereto and, as an irradiation unit capable of radiating linear light in the x-direction, for example, an irradiation unit that forms linear light through, for example, a rod lens or uses a polygonal mirror to perform scanning in a line direction and forms linear light may be used.

The irradiation position-moving mechanism described with reference to FIG. 20, for example, may change the irradiation position by changing a mounting angle of the polygonal mirror or another mirror angle without moving the light source.

Regarding modeling by the modeling apparatus other than the fifth embodiment shown in FIG. 18, for example, a modeled object may be formed by a modeling apparatus without the drum, that is, without using the one-dimensional regulated liquid level method, by using other general optical modeling methods.

Although the above-mentioned irradiation unit includes the one-dimensional LED array, it may include a two-dimensional LED array. Alternatively, the irradiation unit 40 may include a zero-dimensional light source that radiates light to one point and perform printing by scanning this light source in two axes of at least the x- and y-directions.

The shape of the regulation member is the cylindrical, that is, drum shape. However, the regulation member may be formed of a part of the cylindrical body. Alternatively, the shape of the surface of the regulation member as viewed in the x-direction may be a conic section such as an ellipse and a parabola other than a circle. Thus, any shape may be used as long as it has a curved surface convex toward the work plate 13.

The modeling apparatus according to each of the above-mentioned embodiments includes the supply unit that supplies the material to the retention region H. However, the material may be manually supplied to the retention region by a worker.

At least two features of the features of the above-mentioned embodiments can also be combined.

It should be noted that the present technology can also take the following configurations.

(1) A modeling apparatus, including:
a stage;
an irradiation unit that selectively irradiates a region of a material supplied onto the stage, with an energy ray;
a moving mechanism that relatively moves, at least in a stacking direction of the material, the stage and the irradiation unit; and
a stage-rotating mechanism that rotates the stage.

(2) The modeling apparatus according to (1), further including:
a regulation member that includes a surface formed of a curved surface convex toward the stage and is opposed to the stage, to thereby be capable of being disposed such that a retention region is formed between the stage and the surface, in which
the irradiation unit irradiates the material retained in the retention region with an energy ray via the regulation member.

(3) The modeling apparatus according to (1) or (2), further including an additional irradiation unit that irradiates the material formed by irradiation of the irradiation unit, with an energy ray.

(4) The modeling apparatus according to any one of (1) and (3), in which the moving mechanism relatively moves the stage and the irradiation unit along an axis orthogonal to a stage surface of the stage and two axes orthogonal to each other along the stage surface.

(5) The modeling apparatus according to (1), further including
a regulation member-rotating mechanism that rotates the regulation member around an axis along a stage surface of the stage.

(6) A modeling apparatus, including:
a stage;
a first irradiation unit that selectively irradiates a region of a material supplied onto the stage, with an energy ray;
a moving mechanism that relatively moves the stage and the irradiation unit in a stacking direction of the material; and
a second irradiation unit that irradiates the material irradiated by the first irradiation unit, with an energy ray.

(7) The modeling apparatus according to (6), in which the second irradiation unit irradiates the material with an energy ray having an energy per unit time and per unit solid angle that is larger than an energy per unit time and per unit solid angle of the irradiation of the first irradiation unit.

(8) The modeling apparatus according to (6), further including
a removing mechanism that removes an uncured material that remains on the material cured by the irradiation of the irradiation unit.

(9) A modeling apparatus, including:
a stage;
an exposure unit that includes a light-emitting array constituted of a plurality of solid-state light-emitting elements and selectively exposures a region of a material supplied onto the stage to light by the light-emitting array; and
a moving mechanism that relatively moves, at least in a stacking direction of the material, the stage and the light-emitting array.

(10) The modeling apparatus according to (9), in which the plurality of solid-state light-emitting elements are arranged in a one-dimensional form, and
the moving mechanism further includes a mechanism that relatively moves the stage and the light-emitting array along a direction orthogonal to an arrangement direction of the plurality of solid-state light-emitting elements.

(11) The modeling apparatus according to (9), in which the plurality of solid-state light-emitting elements are arranged in a two-dimensional form.

(12) A modeling apparatus, including:
a stage;
a regulation member that includes a surface formed of a curved surface convex toward the stage and is opposed to the stage, to thereby be capable of being disposed such that a retention region including a position of a minimum gap formed in a direction perpendicular to the stage is formed between the stage and the surface;
an irradiation unit that irradiates a material of a material retained in the retention region, which is in a position deviated from the position of the minimum gap, with an energy ray; and
a moving mechanism that relatively moves the stage and the regulation member in a stacking direction of the material.

(13) The modeling apparatus according to (12), further including
an irradiation position-moving mechanism that moves an energy ray irradiation position of the irradiation unit in a direction of the deviation from the position of the minimum gap with respect to the regulation member.

(14) The modeling apparatus according to (12) or (13), in which
a surface of the regulation member is a cylindrical surface,
the irradiation unit is configured to radiate light, and
provided that, if the material is a light-curable resin, a contraction rate of the light-curable resin in a thickness direction is denoted by $\alpha$, a contraction thickness thereof is denoted by dH, a target film thickness of the light-curable resin is denoted by Ht, a radius of the cylinder is denoted by Rg, and the amount of deviation from the position of the minimum gap dD where dD<Rg, Expression below is satisfied

[Expression 4]

$$dD = \sqrt{2 \times Rg \times Ht \times \left(\frac{1}{1-\alpha} - 1\right)}. \qquad \text{Expression (3)}$$

(15) A modeling apparatus, including:
a stage;
a regulation member that includes a surface partitioned into a plurality of regions and is opposed to the stage, to thereby be capable of being disposed such that a retention region is formed between any one region of the plurality of regions of the surface and the stage;
an irradiation unit that irradiates a material retained in the retention region, with an energy ray; and
a moving mechanism that relatively moves the stage and the regulation member in a stacking direction of the material.

(16) The modeling apparatus according to (15), further including
a supply unit that is capable of supplying a first material between a first region that is the any one region and the stage and a second material different from the first material between a second region, which is the any one region and different from the first region, and the stage.

(17) The modeling apparatus according to (15) or (16), in which
the regulation member includes a partition wall that partitions the plurality of regions.

(18) A modeling apparatus, including:
a regulation member that includes a surface formed of a curved surface convex toward a modeling target surface and is capable of being opposed to the modeling target surface, to thereby form a retention region including a gap between the modeling target surface and the surface;
an irradiation unit that selectively radiates an energy ray to a region of a material retained in the retention region;
a traveling body that incorporates the regulation member and the irradiation unit and travels on the modeling target surface; and
a moving mechanism that moves the regulation member in a stacking direction of the material.

(19) A modeled object, including:
a structure formed of a first material, the structure including
an outer surface,
a first aperture,
a second aperture having a capacity larger than a capacity of the first aperture, and a communication channel that causes the outer surface and the first aperture to communicate with each other; and a solid-state second material that is filled in the communication channel and the first aperture and different from the first material.

(20) A modeled object, including:
a structure formed of a first material, the structure including
an outer surface,
a first aperture,
a second aperture having a capacity larger than a capacity of the first aperture,
a first communication channel that causes the outer surface and the second aperture to communicate with each other, and
a second communication channel that causes the first aperture and the second aperture to communicate with each other; and
a filled portion that is filled in the second communication channel and the first aperture and is formed of a solid-state second material different from the first material.

(21) A method of manufacturing a modeled object, including:
supplying a material onto the stage;
printing the material of one or more layers by irradiating a region of the material supplied onto the stage, with an energy ray;
removing an uncured material that remains on a material cured in the printing, by rotating the stage or absorption; and
sequentially performing, after the uncured material is removed, a step of supplying the material and a step of curing the material of the one or more layers.

(22) The method of manufacturing a modeled object according to (21), further including
a step of performing post curing by irradiating, after the uncured material is removed before the material is supplied, the material cured in the printing with an energy ray.

(23) A method of manufacturing a modeled object, including:
forming a structure including an outer surface, a first aperture, a second aperture having a capacity larger than a capacity of the first aperture, and a first communication channel that causes the outer surface and the second aperture to communicate with each other by selectively radiating an energy ray to a region of a first material for each layer, and a second communication channel that causes the first aperture and the second aperture to communicate with each other;
filling the first aperture with a second material different from the first material due to a capillary force via the first communication channel and the second communication channel; and
curing the filled second material.

(24) A method of manufacturing a modeled object, including:
forming a structure including an outer surface, a first aperture, a second aperture having a capacity larger than a capacity of the first aperture, and a communication channel that causes the outer surface and the first aperture to communicate with each other by selectively radiating an energy ray to a region of a first material for each layer;
filling the first aperture with a second material different from the first material due to a capillary force via the communication channel; and
curing the filled second material.

(25) A method of manufacturing a modeled object, including:
supplying a material onto a stage;
printing the material of one or more layers by selectively radiating an energy ray to a region of the material supplied onto the stage;
performing post curing by further radiating an energy ray to the material obtained by the printing; and
printing the material of one or more layers by selectively radiating an energy ray to the region of the material supplied onto the stage after the post curing.

(26) A method of manufacturing a modeled object, including:
supplying a material onto a stage;
selectively exposing a region of the material supplied onto the stage to light by a light-emitting array constituted of a plurality of solid-state light-emitting elements; and
relatively moving the stage and the light-emitting array in a stacking direction of the material.

(27) A method of manufacturing a modeled object by a modeling apparatus, including
a stage, and
a regulation member that includes a surface formed of a curved surface convex toward the stage and is opposed to the stage, to thereby be capable of being disposed such that a retention region including a position of a minimum gap formed in a direction perpendicular to the stage is formed between the stage and the surface, the method including:
supplying a material onto the stage;
irradiating, by an irradiation unit, a material of a material retained in the retention region, which is in a position deviated from the position of the minimum gap, with an energy ray; and
relatively moving the stage and the regulation member in a stacking direction of the material.

(28) A method of manufacturing a modeled object, including:
opposing a regulation member that includes a surface partitioned into a plurality of regions to the stage, to thereby form a retention region between a first region that is any one region of the plurality of regions of the surface and the stage;
supplying a first material into the retention region;
forming a first structure of one or more layers formed of the first material by selectively radiating an energy ray to a region of the first material retained in the retention region;
opposing the regulation member to the stage, to thereby form a retention region between a second region different from the first region that is any one region of the plurality of regions and the stage;
supplying a second material different from the first material into the retention region; and
forming a second structure of one or more layers formed of the second material on the first structure by selectively radiating an energy ray to a region of the second material retained in the retention region.

(29) A method of manufacturing a modeled object, including:
opposing a regulation member that includes a surface formed of a curved surface convex toward a modeling target surface to the modeling target surface, to form a retention region including a gap between the modeling target surface and the surface;
causing a traveling body that incorporates the regulation member and the irradiation unit on the modeling target surface while selectively radiating an energy ray to the region of a material retained in the retention region; and moving the regulation member in a stacking direction of the material.

DESCRIPTION OF SYMBOLS 12 plate-rotating mechanism
13 work plate
14 θ-rotation mechanism
15 supply nozzle
20 moving mechanism
22 x-movement mechanism
24 y-movement mechanism
26 z-movement mechanism
30, 130 exposure head unit
35, 60, 135 drum
35a surface of drum
40, 140 irradiation unit (first irradiation unit)
41 LED
45 LED array
46 irradiation unit (second irradiation unit)
50 absorption mechanism
60A, 60B, 60C region
61 partition wall
70 traveling body
100, 150 modeling apparatus
400 structure (modeled object)
401 outer surface
402 minute aperture
403 aperture
404 filled portion

The invention claimed is:
1. A modeling apparatus, comprising:
a stage;
a regulation member that includes a surface, wherein
the surface includes at least one partitioning member that partitions the surface into a plurality of regions,
the at least one partitioning member includes a rib portion extending along a longitudinal direction of the regulation member, and
the rib portion includes a flange portion protruding along a circumferential direction of the regulation member;
a first irradiation unit configured to cure, by irradiation with an energy ray of the first irradiation unit, a material supplied onto the stage to obtain an irradiated material;
a moving mechanism configured to one of:
move the stage along a specific axis orthogonal to a stage surface of the stage, and the first irradiation unit along two axes, wherein the two axes are along the stage surface, or
move the stage along the two axes, and the first irradiation unit along the specific axis;
a stage-rotating mechanism configured to rotate the stage; and
a tilting mechanism between the stage-rotating mechanism and the stage, wherein the tilting mechanism is configured to tilt the stage-rotating mechanism with respect to the stage for tilt of an axis of rotation of the stage.
2. The modeling apparatus according to claim 1, wherein the surface of the regulation member is opposed to the stage,
a shape of the surface of the regulation member towards the stage is convex,
a retention region is between the stage and the surface of the regulation member, and
the first irradiation unit is further configured to irradiate the material via the regulation member.
3. The modeling apparatus according to claim 1, further comprising a second irradiation unit configured to irradiate the irradiated material with an energy ray of the second irradiation unit.
4. The modeling apparatus according to claim 1, wherein a first axis of the two axes is orthogonal to a second axis of the two axes.
5. The modeling apparatus according to claim 2, further comprising a regulation member-rotating mechanism configured to rotate the regulation member around an axis of the two axes along the stage surface.
6. The modeling apparatus according to claim 1, further comprising a removing mechanism configured to remove uncured material that remains on the irradiated material by a centrifugal force that is produced by the rotation of the stage.
7. A modeling apparatus, comprising:
a stage;
a regulation member that includes a surface, wherein
the surface includes at least one partitioning member that partitions the surface into a plurality of regions,
the at least one partitioning member includes a rib portion extending along a longitudinal direction of the regulation member, and
the rib portion includes a flange portion protruding along a circumferential direction of the regulation member;
a first irradiation unit configured to cure, by irradiation with an energy ray of the first irradiation unit, a material supplied onto the stage to obtain an irradiated material;
a moving mechanism configured to one of:
move the stage along a specific axis orthogonal to a stage surface of the stage, and the first irradiation unit along two axes, wherein the two axes are along the stage surface, or
move the stage along the two axes, and the first irradiation unit along the specific axis;
a second irradiation unit configured to irradiate the irradiated material with a second energy ray of the second irradiation unit;
a stage-rotating mechanism configured to rotate the stage; and
a tilting mechanism between the stage-rotating mechanism and the stage, wherein the tilting mechanism is configured to tilt the stage-rotating mechanism with respect to the stage for tilt of an axis of rotation of the stage.
8. The modeling apparatus according to claim 7, wherein an energy per unit time and per unit solid angle of the energy ray of the second irradiation unit is larger than an energy per unit time and per unit solid angle of the energy ray of the first irradiation unit.
9. A modeling apparatus, comprising:
a stage;
a regulation member that includes a surface, wherein
the surface includes at least one partitioning member that partitions the surface into a plurality of regions,
the at least one partitioning member includes a rib portion extending along a longitudinal direction of the regulation member, and
the rib portion includes a flange portion protruding along a circumferential direction of the regulation member;

an exposure unit that includes a light-emitting array, wherein
the light-emitting array comprises a plurality of solid-state light-emitting elements, and
the light-emitting array is configured to cure a material supplied onto the stage;
a moving mechanism configured to one of:
move the stage along a specific axis orthogonal to a stage surface of the stage, and the light-emitting array along two axes, wherein the two axes are along the stage surface, or
move the stage along the two axes, and the light-emitting array along the specific axis;
a stage-rotating mechanism configured to rotate the stage; and
a tilting mechanism between the stage-rotating mechanism and the stage, wherein the tilting mechanism is configured to tilt the stage-rotating mechanism with respect to the stage for tilt of an axis of rotation of the stage.

10. The modeling apparatus according to claim 9, wherein the plurality of solid-state light-emitting elements is in a one-dimensional arrangement, and
the moving mechanism is further configured to move one of the stage or the light-emitting array along a direction that is orthogonal to a direction of the one-dimensional arrangement of the plurality of solid-state light-emitting elements.

11. The modeling apparatus according to claim 9, wherein the plurality of solid-state light-emitting elements is in a two-dimensional arrangement.

12. A modeling apparatus, comprising:
a stage;
a regulation member that includes a surface, wherein
the surface includes at least one partitioning member that partitions the surface into a plurality of regions,
the at least one partitioning member includes a rib portion extending along a longitudinal direction of the regulation member,
the rib portion includes a flange portion protruding along a circumferential direction of the regulation member,
the surface of the regulation member is opposed to the stage,
a shape of the surface of the regulation member towards the stage is convex,
a retention region is between the stage and the surface of the regulation member, and
the retention region includes a gap in a direction orthogonal to the stage;
an irradiation unit configured to cure, by irradiation with an energy ray, a material retained in the retention region,
wherein a position of the material is deviated from a position of the gap;
a moving mechanism configured to one of:
move the stage along a specific axis orthogonal to a stage surface of the stage, and the irradiation unit along two axes, wherein the two axes are along the stage surface, or
move the stage along the two axes, and the irradiation unit along the specific axis;
a stage-rotating mechanism configured to rotate the stage; and
a tilting mechanism between the stage-rotating mechanism and the stage, wherein the tilting mechanism is configured to tilt the stage-rotating mechanism with respect to the stage for tilt of an axis of rotation of the stage.

13. A modeling apparatus, comprising:
a stage;
a regulation member that includes a surface, wherein
the surface includes at least one partitioning member that partitions the surface into a plurality of regions,
the at least one partitioning member includes a rib portion extending along a longitudinal direction of the regulation member,
the rib portion includes a flange portion protruding along a circumferential direction of the regulation member,
the regulation member is opposed to the stage, and
a retention region is between a first region of the plurality of regions and the stage;
an irradiation unit configured to cure, by irradiation with an energy ray, a first material retained in the retention region;
a moving mechanism configured to one of:
move the stage along a specific axis orthogonal to a stage surface of the stage, and the irradiation unit along two axes, wherein the two axes are along the stage surface, or
move the stage along the two axes, and the irradiation unit along the specific axis;
a stage-rotating mechanism configured to rotate the stage; and
a tilting mechanism between the stage-rotating mechanism and the stage, wherein the tilting mechanism is configured to tilt the stage-rotating mechanism with respect to the stage for tilt of an axis of rotation of the stage.

14. The modeling apparatus according to claim 13, further comprising a supply unit configured to:
supply a second material between a second region of the plurality of regions and the stage; and
supply a third material, different from the second material, between a third region of the plurality of regions and the stage,
wherein the third region is different from the second region.

15. A modeling apparatus, comprising:
a modeling target surface;
a regulation member that includes a surface, wherein
the surface includes at least one partitioning member that partitions the surface into a plurality of regions,
the at least one partitioning member includes a rib portion extending along a longitudinal direction of the regulation member,
the rib portion includes a flange portion protruding along a circumferential direction of the regulation member,
the surface of the regulation member is opposed to the modeling target surface,
a shape of the surface of the regulation member towards the modeling target surface is convex,
a retention region is between the modeling target surface and the surface of the regulation member, and
the retention region includes a gap between the modeling target surface and the surface of the regulation member;
an irradiation unit configured to radiate an energy ray to a material retained in the retention region;
a traveling body configured to travel on the modeling target surface, wherein the travelling body comprises a main body and a plurality of wheels, the main body, different from the regulation member, is connected with the plurality of wheels, and the regulation member is mountable on the main body; and a moving mechanism in the traveling body, wherein the moving mechanism is configured to move the regulation member in a stacking direction of the material.

16. The modeling apparatus according to claim 15, wherein the moving mechanism comprises the plurality of wheels, and a first rotation axis of a first wheel of the plurality of wheels is different from a second rotation axis of a second wheel of the plurality of wheels.

* * * * *